(12) United States Patent
Miyake et al.

(10) Patent No.: US 9,110,614 B2
(45) Date of Patent: Aug. 18, 2015

(54) TERMINAL DEVICE AND PRINTER

(71) Applicant: Brother Kogyo Kabushiki Kaisha, Nagoya-shi, Aichi-ken (JP)

(72) Inventors: Takeshi Miyake, Nagoya (JP); Takanobu Suzuki, Nagoya (JP); Fumio Okumura, Nagoya (JP); Naoto Shiraga, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/447,724

(22) Filed: Jul. 31, 2014

(65) Prior Publication Data

US 2015/0036170 A1 Feb. 5, 2015

(30) Foreign Application Priority Data

Jul. 31, 2013 (JP) .................................. 2013-159538

(51) Int. Cl.
*G06F 3/12* (2006.01)
*H04W 12/06* (2009.01)

(52) U.S. Cl.
CPC ............ *G06F 3/1238* (2013.01); *G06F 3/1203* (2013.01); *G06F 3/1222* (2013.01); *G06F 3/1267* (2013.01); *G06F 3/1288* (2013.01); *G06F 3/1292* (2013.01); *G06F 3/1224* (2013.01); *G06F 3/1255* (2013.01); *G06F 3/1258* (2013.01); *G06F 3/1287* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 8,749,823 B2 | 6/2014 | Kato | |
| 2002/0140972 A1* | 10/2002 | Onishi | 358/1.15 |
| 2005/0002058 A1* | 1/2005 | Hirabayashi | 358/1.15 |
| 2007/0146778 A1* | 6/2007 | Kitagata et al. | 358/1.15 |
| 2011/0292445 A1 | 12/2011 | Kato | |
| 2013/0070288 A1* | 3/2013 | Muranaka | 358/1.15 |

(Continued)

FOREIGN PATENT DOCUMENTS

| | | |
|---|---|---|
| JP | 2003-280832 A | 10/2003 |
| JP | 2008-040963 A | 2/2008 |

(Continued)

OTHER PUBLICATIONS

Oct. 27, 2014—(EP) Extended European Search Report—App 14173971.4.

(Continued)

*Primary Examiner* — Miya J Cato
(74) *Attorney, Agent, or Firm* — Banner & Witcoff, Ltd.

(57) ABSTRACT

A terminal device may send authentication information to a printer, obtain, from a print intermediation server by using the authentication information, M pieces of file identification information for identifying M files in a case where M pieces of file related information and the authentication information are being registered in association in the print intermediation server, control a display unit of the terminal device to display a first selection screen causing a user to select first file identification information from among the M pieces of file identification information, and send, to the printer, a print instruction including the first file identification information. The authentication information and the first file identification information may be used by the printer, in order to obtain, from the print intermediation server, print data created from a first file identified by the first file identification information.

16 Claims, 9 Drawing Sheets

(56) References Cited

U.S. PATENT DOCUMENTS

| | | |
|---|---|---|
| 2013/0077125 A1 | 3/2013 | Kitagata |
| 2015/0036189 A1* | 2/2015 | Shiraga et al. ............... 358/1.15 |
| 2015/0036191 A1* | 2/2015 | Suzuki et al. ............... 358/1.15 |

FOREIGN PATENT DOCUMENTS

| | | |
|---|---|---|
| JP | 2009-070240 A | 4/2009 |
| JP | 2013-073314 A | 4/2013 |
| WO | 2010107125 A1 | 9/2010 |

OTHER PUBLICATIONS

"What is Google Cloud Print", online, Jun. 25, 2013, <URL: http://developers.google.com/cloud-print/> and <URL:http://developers.google.com/cloud-print/docs/overview>.

Co-pending U.S. Appl. No. 14/317,000, filed Jun. 27, 2014.

* cited by examiner (Third Embodiment)
Print Process

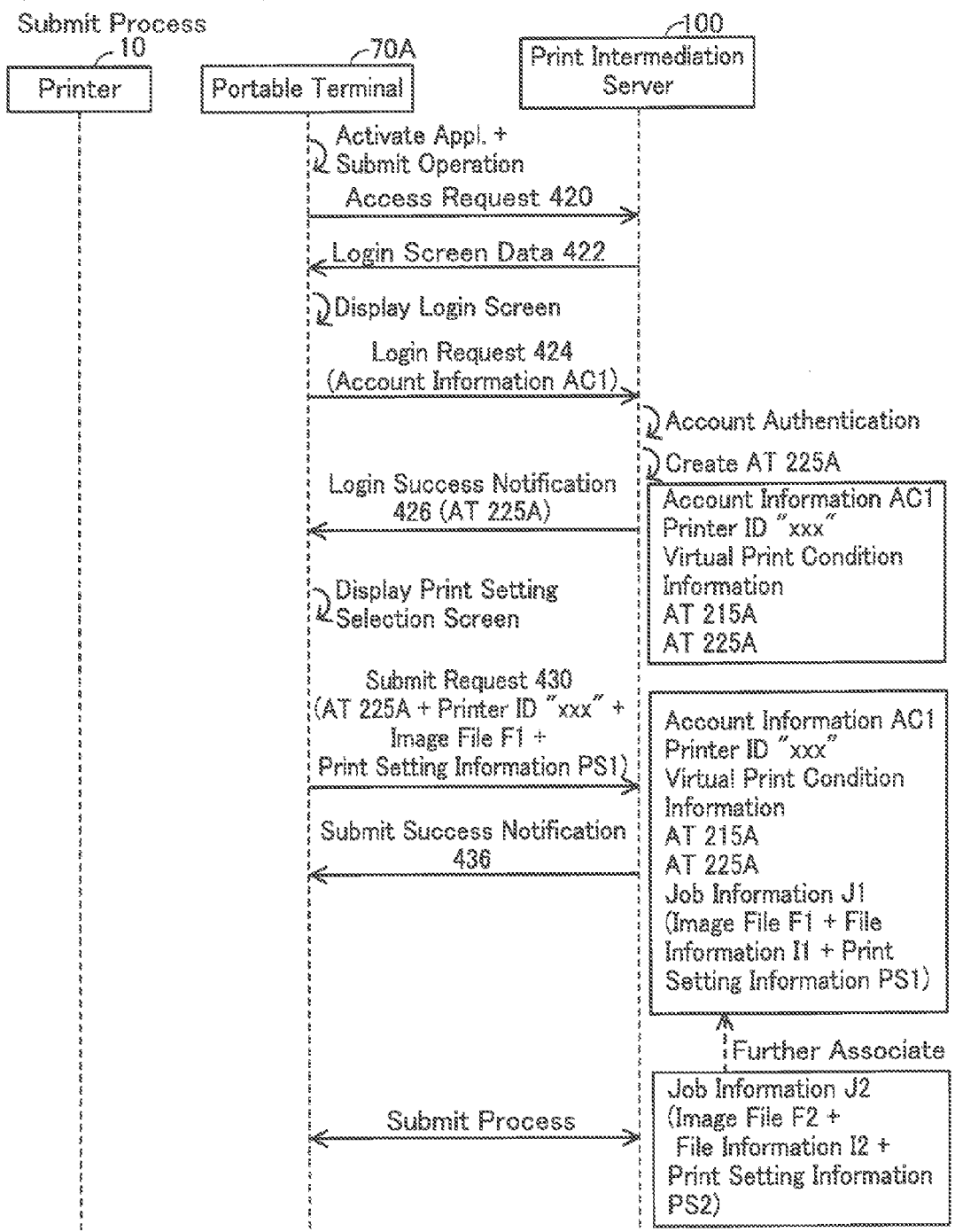

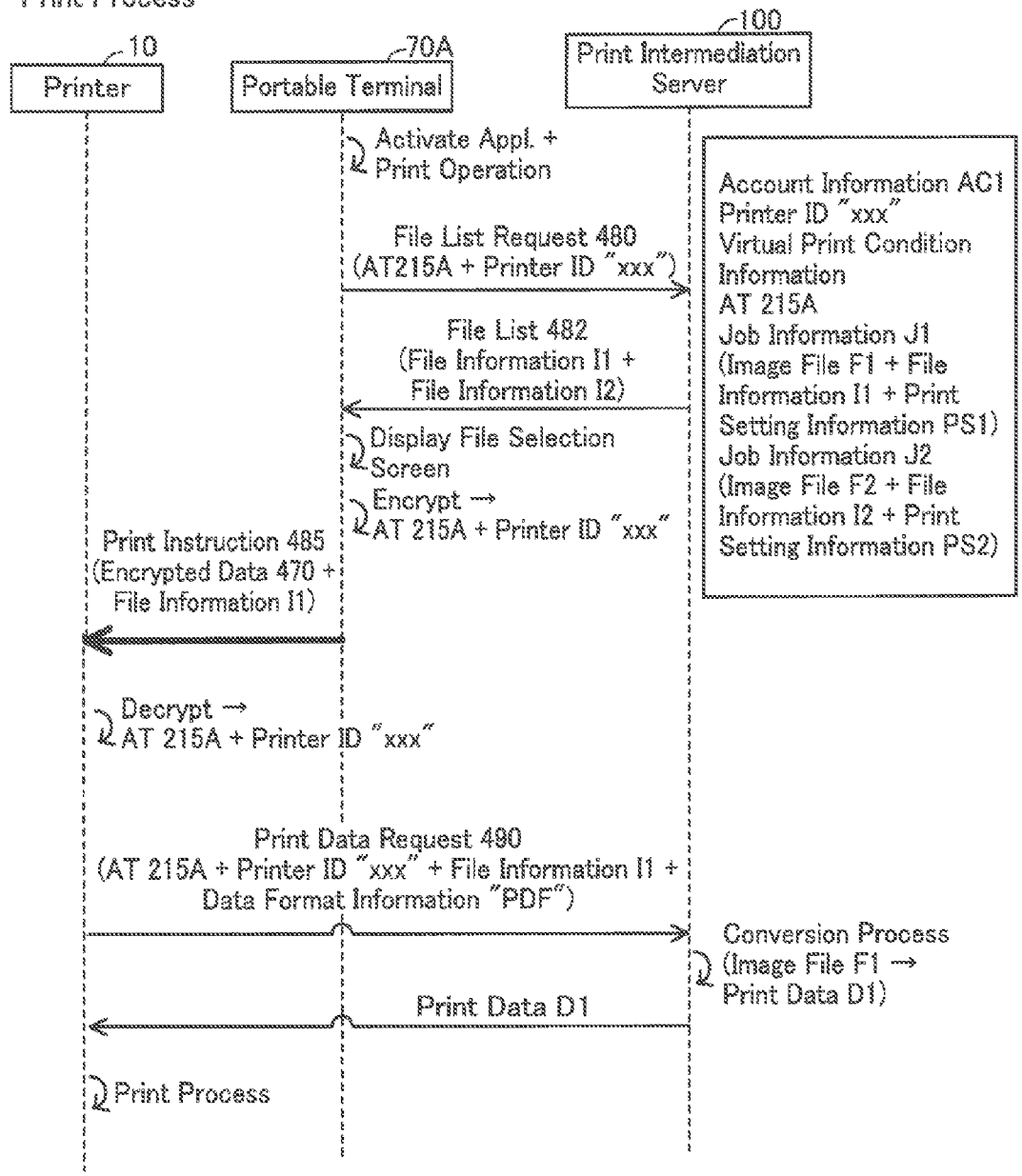

TERMINAL DEVICE AND PRINTER

CROSS-REFERENCE TO RELATED APPLICATIONS

This application claims priority to Japanese Patent Application No. 2013-159538, filed on Jul. 31, 2013, the contents of which are hereby incorporated by reference into the present application.

TECHNICAL FIELD

The present specification discloses a technique in which a terminal device causes a printer to perform a print using a print intermediation server.

DESCRIPTION OF RELATED ART

A technique of causing a printer to perform a print, by sending data from a terminal device to a server, and receiving at the printer the data from the server is known. For example, a service on the Internet called Google (registered trademark) Cloud Print (referred to as "GCP" below) is known. A user accesses a printer by using, for example, a terminal device, and causes the printer to perform a communication with a server which provides the GCP (referred to as a "GCP server" below). By this means, the printer can register printer related information being related to the printer in the GCP server. Consequently, an XMPP (abbreviation of eXtensible Messaging and Presence Protocol) connection is established between the printer and the GCP server. Subsequently, the user submits an image file which represents an image of a print target to the GCP server by using, for example, the terminal device. In this case, by using the XMPP connection, the GCP server supplies a submit notification to the printer. When obtaining the submit notification from the GCP server, the printer obtains from the GCP server print data created from the image file, and performs a print of an image represented by the print data.

SUMMARY

According to the above technique, if the image file is submitted to the GCP server, the printer obtains the submit notification from the GCP server, then obtains the print data from the GCP server, and performs a print. Consequently, a print is usually performed by the printer immediately after the image file was submitted to the GCP server. Therefore, a print is usually performed even if the user does not desire to perform a print after the image file was submitted. to the GCP server. The present specification provides a technique that may improve a user convenience.

A terminal device may comprise: a processor; and a memory storing computer-readable instructions therein. The computer-readable instructions, when executed by the processor, may cause the terminal device to perform: sending authentication information to a printer, the authentication information causing the printer to use a print intermediation server; obtaining, from the print intermediation server by using the authentication information, M pieces of file identification information for identifying M files from the print intermediation server by using the authentication information, in a case where M pieces of file related information being related to the M files and the authentication information are being registered in association in the print intermediation server, the M being an integer of 2 or more; controlling a display unit of the terminal device to display a first selection screen, the first selection screen causing a user to select first file identification information from among the M pieces of file identification information; and sending, to the printer, a print instruction including the first file identification information, the authentication information and the first file identification information being used by the printer which received the print instruction, in order to obtain, from the print intermediation server, print data created from a first file identified by the first file identification information.

A printer may comprise: a print performing unit; a processor; and a memory storing computer-readable instructions therein. The computer-readable instructions, when executed by the processor, may cause the printer to perform: receiving first authentication information from a first terminal device, the first authentication information causing the printer to use a print intermediation server; receiving, from the first terminal device, a first print instruction including first file identification information, in a case where M pieces of file related information being related to M files and the first authentication information are being registered in association in the print intermediation server, the first file identification information being selected by a user of the first terminal device from among M pieces of file identification information for identifying the M files, the M being an integer of 2 or more; obtaining, from the print intermediation server, first print data by using the first authentication information and the first file identification information, in a case where the first print instruction is received from the first terminal device, the first print data being created from a first file identified by the first file identification information; and controlling the print performing unit to perform a print by using the first print data.

The present specification also discloses a non-transitory computer-readable medium storing computer-readable instructions for a terminal device. The computer-readable instructions, when executed by a processor mounted on the terminal device, may cause the terminal device to perform: obtaining, from a print intermediation server by using authentication information, M pieces of file identification information for identifying M files, in a case where M pieces of file related information being related to the M files and the authentication information are being registered in association in the print intermediation server, the M being an integer of 2 or more; controlling a display unit of the terminal device to display a first selection screen, the first selection screen causing a user to select first file identification information from among the M pieces of file identification information; and sending, to a printer, the authentication information and the first file identification information, the authentication information and the first file identification information being used by the printer which received the authentication information and the first file identification information, in order to obtain, from the print intermediation server, print data created from a first file identified by the first file identification information.

A printer may comprise: a print performing unit; a processor; and a memory storing computer-readable instructions therein. The computer-readable instructions, when executed by the processor, may cause the printer to perform: receiving, from a first terminal device, first authentication information and first file identification information, in a case where M pieces of file related information being related to M files and the first authentication information are being registered in association in a print intermediation server, the first file identification information being selected by a user of the first terminal device from among M pieces of file identification information for identifying the M files, the M being an integer of 2 or more; obtaining, from the print intermediation server, first print data by using the first authentication information and the first file identification information, in a case where the first authentication information and the first file identification information are received from the first terminal device, the first print data being created from a first file identified by the first file identification information; and controlling the print performing unit to perform a print by using the first print data.

A control method, computer-readable instructions, and a non-transitory computer-readable medium storing the computer-readable instructions, for achieving any one of the above devices (that is, the terminal device or the printer), are also new and useful. Further, a communication system which has the above terminal device and printer is also new and useful.

BRIEF DESCRIPTION OF THE DRAWINGS

FIG. 8 illustrates a sequence diagram of a submit process according to a fourth embodiment;
and
FIG. 9 illustrates a sequence diagram of a print process according to a fourth embodiment.

EMBODIMENT (First Embodiment)

Figure 1:
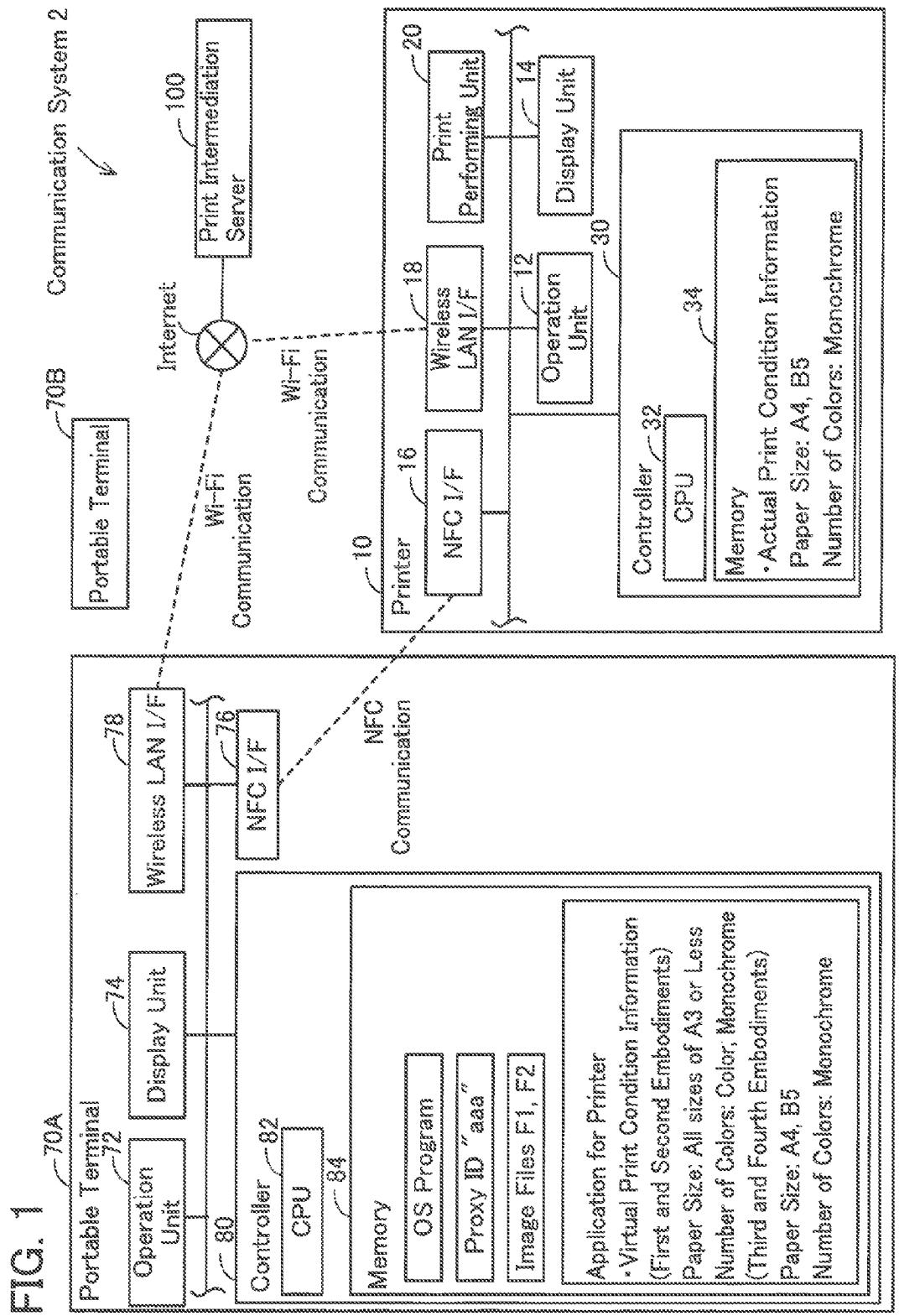
FIG. 1 illustrates a configuration of a communication system.

As illustrated in FIG. 1, a communication system 2 has a printer 10, a plurality of portable terminals 70A and 70B, and a print intermediation server 100. Each of the devices 10, 70A, 70B and 100 can perform a communication with each other via the Internet.

(Configuration of Printer 10)

The printer 10 is a peripheral apparatus (i.e. peripheral apparatus of a PC or the like) which can perform a printing function. The printer 10 comprises an operation unit 12, a display unit 14, an NFC (abbreviation of Near Field Communication) interface 16, a wireless LAN (abbreviation of Local Area Network) interface 18, a print performing unit 20, and a controller 30. Each of the units 12 to 30 is connected to a bus line (a reference numeral is not illustrated). Hereinafter, the interface will be described as an "I/F".

The operation unit 12 comprises a plurality of keys. A user can give various instructions to the printer 10 by operating the operation unit 12. The display unit 14 is a display for displaying various pieces of information. The print performing unit 20 is a printing mechanism such as an ink jet printing or a laser printing.

The NFC I/F 16 is an I/F (i.e. an IC chip or a communication circuit) for performing a wireless communication in accordance with an NFC scheme for a so-called short distance wireless communication (referred to as an "NFC communication" below). The NFC scheme, for example, is a wireless communication scheme based on an international standard of ISO/IEC21481 or 18092.

The wireless LAN I/F 18 is an I/F (i.e. an IC chip or a communication circuit) for performing a wireless communication in accordance with the Wi-Fi scheme defined by the Wi-Fi Alliance (referred to as a "Wi-Fi communication" below). The Wi-Fi scheme, for example, is a wireless communication scheme based on the standard of 802.11 of IEEE (abbreviation of The Institute of Electrical and Electronics Engineers, Inc.) and a standard (e.g. 802.11a, 11b, 11g or 11n) equivalent to this standard. The wireless LAN I/F 18 may be an I/F for performing a wireless communication via an access point (e.g. a wireless communication of an infrastructure scheme), or may be an I/F for performing a wireless communication not via an access point (e.g. a wireless communication of an ad-hoc scheme or a Wi-Fi Direct scheme).

Here, a difference between the NFC I/F 16 and the wireless LAN I/F 18 will be described. A communication speed (e.g. a maximum communication speed is 11 to 600 Mbps) of a wireless communication via the wireless LAN I/F 18 is faster than a communication speed (e.g. a maximum communication speed is 100 to 424 Kbps) of a wireless communication via the NFC I/F 16. Further, a frequency of a carrier wave (e.g. a 2.4 GHz band or a 5.0 GHz band) upon a wireless communication via the wireless LAN I/F 18 is different from a frequency of a carrier wave (e.g. a 13.56 MHz band) upon a wireless communication via the NFC I/F 16. Furthermore, for example, when a distance between the NFC I/F 16 of the printer 10 and an NFC I/F of another apparatus (e.g. the portable terminal 70A) is about 10 cm or less, the controller 30 can perform an NFC communication with said apparatus via the NFC I/F 16. However, a distance between the NFC I/F 16 of the printer 10 and an NFC I/F of another apparatus is more than 10 cm, the controller 30 can not perform an NFC communication with said apparatus via the NFC I/F 16. Meanwhile, even when a distance between the wireless LAN I/F 18 of the printer 10 and the wireless LAN I/F of another apparatus (e.g. the portable terminal 70A, an access point) is 10 cm or less or 10 cm or more (e.g. about 100 m at maximum), the controller 30 can perform a Wi-Fi communication with the apparatus via the wireless LAN I/F 18. That is, a maximum distance at which the printer 10 can perform a wireless communication with another apparatus via the wireless LAN I/F 18 is longer than a maximum distance at which the printer 10 can perform a wireless communication with another apparatus via the NFC I/F 16.

The controller 30 comprises a CPU 32 and a memory 34. The CPU 32 is a processor which performs various processes in accordance with a program (not illustrated) stored in the memory 34. The memory 34 is configured by a RAM, a ROM and the like.

The memory 34 further stores actual print condition information. The actual print condition information indicates an actual print condition which is capable of being used actually in the printer 10. The actual print condition information includes sheet size information indicating sizes of print sheets, and number of colors information indicating number of colors. The sheet size information included in the actual print condition information indicates "A4" and "B5". The number of colors information included in the actual print condition information indicates "monochrome print". Moreover, the actual print condition information may further include other information indicating whether it is capable of duplex printing, page orientation (e.g., landscape print, portrait print) etc.

(Configuration of Portable Terminals 70A, 70B)

Each of the portable terminals 70A, 70B is a portable terminal device such as a mobile telephone (e.g. a smartphone), a PDA, a notebook PC, a tablet PC, a portable music playback device or a mobile movie playback device. Each of the portable terminals 70A, 70B comprises the same configuration. The portable terminal 70A comprises an operation unit 72, a display unit 74, an NFC I/F 76, a wireless LAN I/F 78 and a controller 80. Each of the units 72 to 80 is connected to a bus line (a reference numeral is not illustrated).

The operation unit 72 comprises a plurality of keys. A user can give various instructions to the portable terminal 70A by operating the operation unit 72. The display unit 74 is a display for displaying various pieces of information. The NFC I/F 76 and the wireless LAN I/F 78 are the same as the NFC I/F 16 and the wireless LAN I/F 18 of the printer 10, respectively. Hence, the difference between the NFC I/F 76 and the wireless LAN I/F 78 is the same as the difference between the NFC I/F 16 and the wireless LAN I/F 18.

The controller 80 comprises a CPU 82 and a memory 84. The CPU 82 is a processor which performs various processes in accordance with an OS program stored in the memory 84. The memory 84 is configured by a RAM, a ROM and the like. The memory 84 stores further stores a proxy ID, a plurality of image files F1, F2, and an application for printer (referred to as a "printer appl." below).

The proxy ID is an ID for identifying the portable terminal 70A, and its specific value is "aaa". Each of the image files F1, F2 is a file which represents an image captured by, e.g., the portable terminal 70A. Each of the image files F1, F2 may be a file in any file format, e.g., may be a file in bitmap format such as JPEG (abbreviation of Joint Photographic Experts Group), may be a file in vector format, or may be a tile in text format.

The printer appl. is an application for causing the printer 10 to perform a print by using the print intermediation server 100. The printer appl. is an application provided by a vendor of the printer 10. The printer appl. may be installed to the portable terminal 70A from a server on the Internet, or may be installed to the portable terminal 70A from a medium shipped together with the printer 10.

The printer appl. includes virtual print condition information indicating a virtual print condition which is capable of being used virtually in a virtual printer, not an actual printer (e.g., the printer 10). The virtual print condition information indicates all print conditions which are capable of being used actually in various models of printers sold by the vendor of the printer 10, and includes the sheet size information and the number of colors information. The sheet size information included in the virtual print condition information indicates all sizes of "A3" or less, e.g., A sizes such as "A4" and "A5", B sizes such as "B4" and "B5", legal size, letter size, etc. Further, the number of colors information included in the virtual print condition information indicates "color print" and "monochrome print".

As described above, the virtual print condition information indicates all print conditions which are capable of being used actually in various models of printers including the printer 10. Accordingly, the actual print condition (i.e. the sheet size information "A4" and "B5", the number of colors information "monochrome print") indicated by the actual print condition information of the printer 10 is included in the virtual print condition indicated by the virtual print condition information. That is, the actual print condition is a print condition within a range of the virtual print condition.

(Configuration of Print Intermediation Server 100)

The print intermediation server 100 is a server which is located on the Internet, and is a server provided by the vendor of the printer 10. In this regard, in modified embodiments, the print intermediation server 100 may be a server provided by a business operator different from the vendor of the printer 10.

The print intermediation server 100 is a server for performing an intermediation of a print between an external apparatus (e.g. the portable terminal 70A) and a printer (e.g. the printer 10). That is, the print intermediation server 100 converts image file submitted from the external apparatus, creates print data in a data format which can be interpreted by the printer, and supplies the print data to the printer. Therefore, even when the external apparatus does not comprise a printer driver for converting the image data into the print data, the external apparatus can cause the printer to perform a print by submitting the image file to the print intermediation server 100.

(Advance Preparation)

Each user of each portable terminal 70A, 70B performs the following advance preparation in order to cause the printer 10 to perform a print via the print intermediation server 100.

That is, the user of the portable terminal 70A registers account information in the print intermediation server 100 by using, for example, the portable terminal 70A. The account information includes, for example, a user ID, a password and the like. It should be noted that, the user may register the account information in the print intermediation server 100 by using another apparatus (e.g. a PC) instead of using the portable terminal 70A. When the account information of the user is registered in the print intermediation server 100, the user can cause the printer 10 to perform a print by using the print intermediation server 100.

Figure 2:
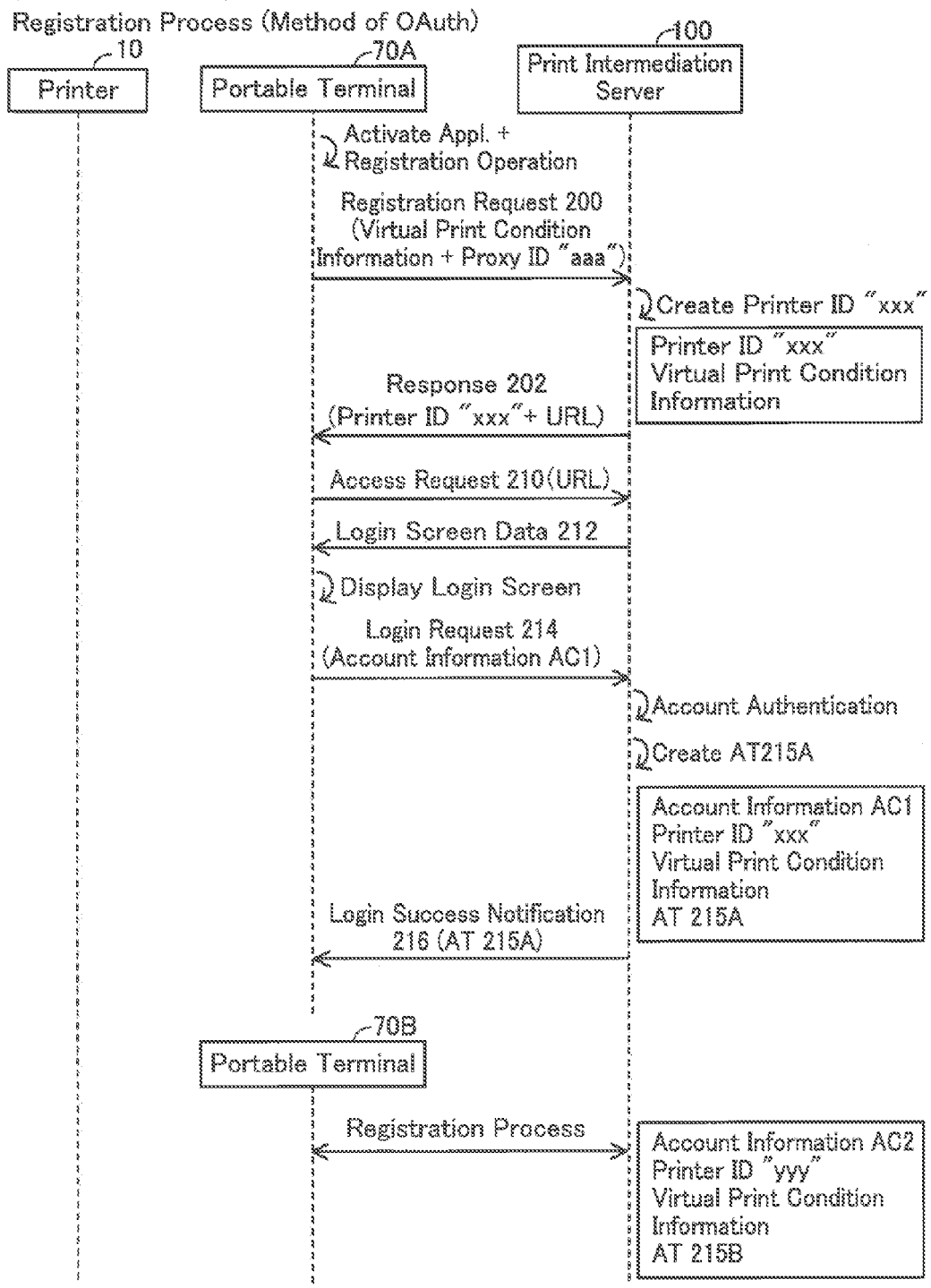
FIG. 2 illustrates a sequence diagram of a registration process.
Figure 3:
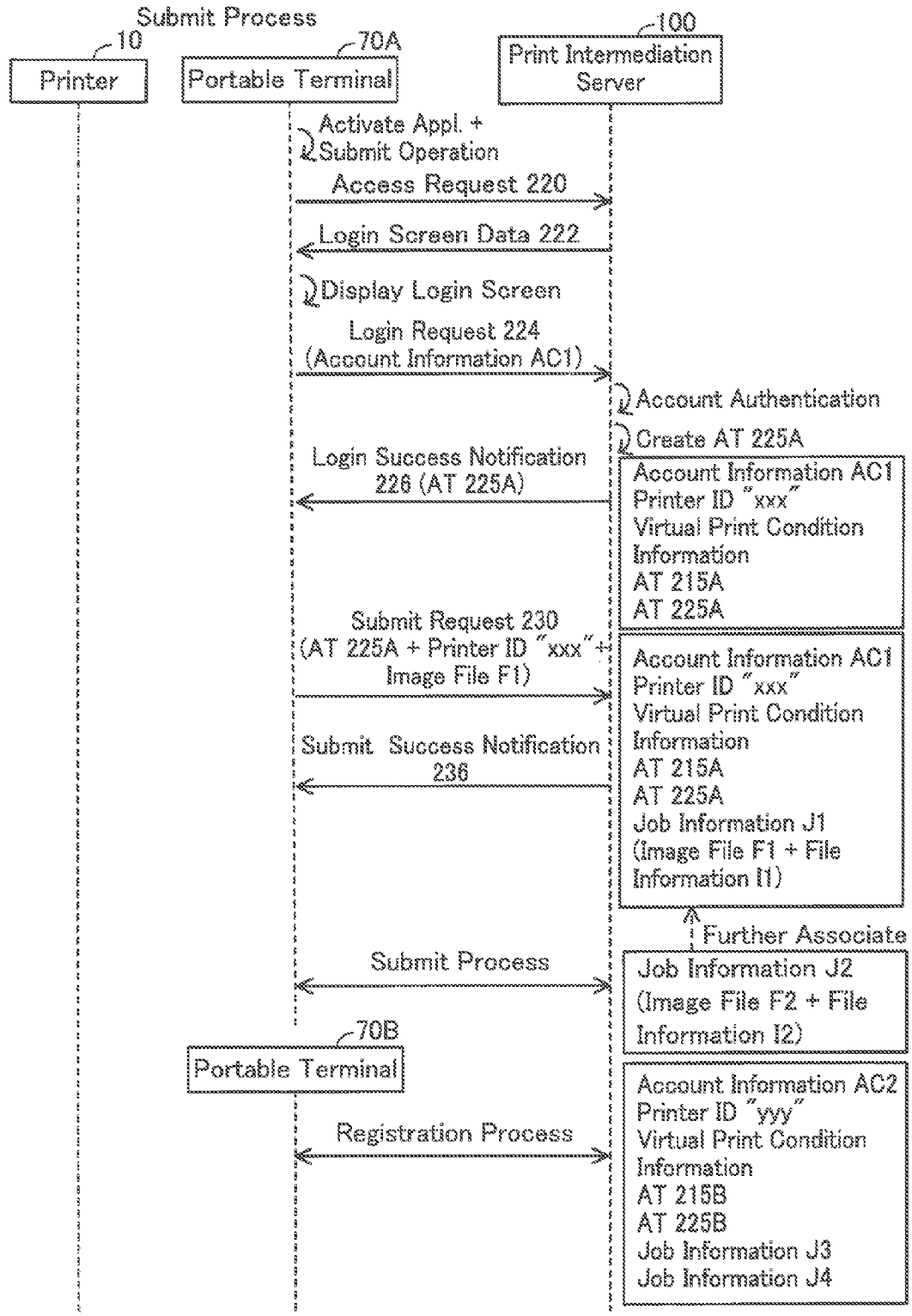
FIG. 3 illustrates a sequence diagram of a submit process.
Figure 4:
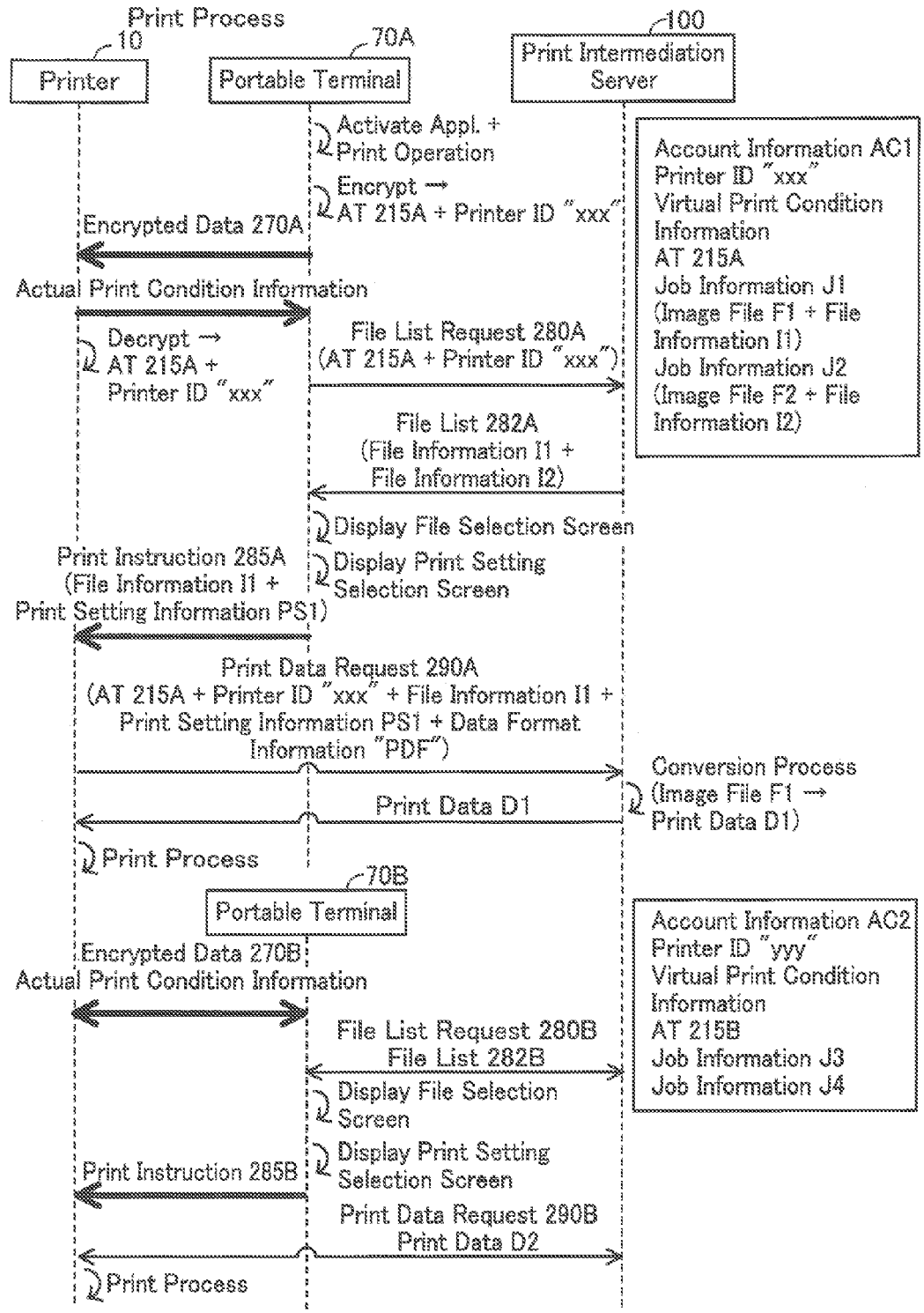
FIG. 4 illustrates a sequence diagram of a print process.

Similar to the case of the portable terminal 70A, the user of the portable terminal 70B registers account information in the print intermediation server 100. in FIG. 2 to FIG. 4, the account information which is registered by the user of the portable terminal 70A and the account information which is registered by the user of the portable terminal 70B are described as "AC1" and "AC2", respectively.

(Registration Process; FIG. 2)

Subsequently, a registration process for each of the portable terminals 70A, 70B to register various pieces of information in the print intermediation server 100 will be described with reference to FIG. 2. In the present embodiment, the registration process using OAuth is performed.

In the registration process, the user of the portable terminal 70A may not be present near the printer 10. That is, for example, in a situation that the printer 10 is located at home and the user goes out carrying the portable terminal 70A, the user can register various pieces of information in the print intermediation server 100 by using the portable terminal 70A.

The user of the portable terminal 70A first activates the printer appl. being installed in the portable terminal 70A, and performs a registration operation. The registration operation includes selecting a button indicating "registration" on a screen which is displayed in accordance with the printer appl. The CPU 82 of the portable terminal 70A performs each process illustrated in FIG. 2 in accordance with the printer appl. when the registration operation is performed.

The CPU 82 of the portable terminal 70A first obtains the virtual print condition information included in the printer appl., and a proxy ID "aaa" of the portable terminal 70A from the memory 84. Next, the CPU 82 supplies the print intermediation server 100 with a registration request 200 including the virtual print condition information and the proxy ID "aaa" via the wireless LAN I/F 78 (i.e., performs a Wi-Fi communication). Moreover, a URL of the print intermediation server 100, which is a supply destination of the registration request 200, is registered in advance in the printer appl. Below, unless described in particular, the URL of the request supply destination is registered in advance in the printer appl.

When obtaining the registration request 200 from the portable terminal 70A, the print intermediation server 100 creates a printer ID "xxx" for identifying a registration target printer by using the proxy ID "aaa" included in the registration request 200. Since the proxy ID "aaa" is the proxy ID of the portable terminal 70A and is not the proxy ID of an actual printer (e.g., the printer 10), the printer ID "xxx" created from the proxy ID "aaa" is not an ID for identifying the actual printer, but can be said to be an ID for identifying a virtual printer.

The print intermediation server 100 associates the printer ID "xxx" of the virtual printer with the virtual print condition information included in the registration request 200 and stores them. In FIG. 2, boxes on the right of the broken line corresponding to the print intermediation server 100 indicate that each piece of information in the boxes is associated with each other. The same also applies for FIG. 3 and subsequent figures.

Next, the print intermediation server 100 supplies to the portable terminal 70A a response 202 including the printer ID "xxx" and a login URL which indicates a location of login screen data 212 described below.

When obtaining the response 202 from the print intermediation server 100 via the wireless LAN I/F 78, the CPU 82 of the portable terminal 70A stores in the memory 84 the printer ID "xxx" included in the response 202 (see FIG. 1). Next, the CPU 82 supplies an access request 210 to the print intermediation server 100 via the wireless LAN I/F 78 with the login URL included in the response 202 as the supply destination.

When obtaining the access request 210 from the portable terminal 70A, the print intermediation server 100 supplies the login screen data 212 to the portable terminal 70A. The login screen data 212 is data which represents a login screen for inputting account information (i.e., a user ID, password etc.).

When obtaining the login screen data 212 from the print intermediation server 100 via the wireless LAN I/F 78, the CPU 82 of the portable terminal 70A controls the display unit 74 to display a login screen represented by the login screen data 212. The user inputs, in the portable terminal 70A by using the operation unit 72, the account information AC1 registered in the print intermediation server 100 upon the above advance preparation. In this case, the CPU 82 supplies a login request 214 including the account information AC1 to the print intermediation server 100 via the wireless LAN I/F 78.

Moreover, the account information AC1 is inputted to the portable terminal 70A by the user in the present embodiment. Instead, when for example the above advance preparation is performed by using the portable terminal 70A, the memory 84 of the portable terminal 70A may store the account information AC1. In this case, the CPU 82 of the portable terminal 70A may obtain the account information AC1 from the memory 84 without having the user input the account information AC1, and supply the login request 214 including the account information AC1 to the print intermediation server 100.

When obtaining the login request 214 from the portable terminal 70A, the print intermediation server 100 performs authentication of the account information AC1 included in the login request 214. Specifically, the print intermediation server 100 judges whether or not the account information AC1 included in the login request 214 is already registered in the print intermediation server 100. When judging that the account information AC1 is not yet registered, that is, when failing to authenticate the account information AC1, the print intermediation server 100 supplies a login failure notification to the portable terminal 70A although not illustrated. In this case, the registration process is finished without performing subsequent processes.

When judging that the account information AC1 is already registered, that is, when succeeding to authenticate the account information AC1, the print intermediation server 100 creates an AT (abbreviation of Authentication (or Access) Token) 215A which is a unique token (i.e., character string). Then, the print intermediation server 100 associates the successfully authenticated account information AC1, the printer ID "xxx", the virtual print condition information, and the AT 215A with each other and stores them. Next, the print intermediation server 100 supplies a login success notification 216 including the AT 215A to the portable terminal 70A.

When obtaining the login success notification 216 from the print intermediation server 100 via the wireless LAN I/F 78, the CPU 82 of the portable terminal 70A stores the AT 215A included in the login success notification 216 in the memory 84 (see FIG. 1). By this means, the registration process for the portable terminal 70A to register various pieces of information in the print intermediation server 100 is finished.

The portable terminal 70B performs the same operation as the portable terminal 70A in order to register various pieces of information in the print intermediation server 100. As a result, the account information AC2 of the user of the portable terminal 70B, a printer ID "yyy" of the virtual printer, the virtual print condition information, and the AT 215B are associated in the print intermediation server 100.

(Submit Process; FIG. 3)

Subsequently, a submit process for submitting (i.e., registering) an image file which represents an image of a print target from each of the portable terminals 70A, 70B to the print intermediation server 100 will be described with reference to FIG. 3. Also in the submit process, similar to the registration process in FIG. 2, the user of the portable terminal 70A may not be present near the printer 10. For example, the user can submit an image file which represents an image captured by the portable terminal 70A at a visiting place to the print intermediation server 100.

When desiring to submit the image file F1 (see FIG. 1) in the memory 84 to the print intermediation server 100, the user of the portable terminal 70A activates the printer appl., and performs a submit operation. The submit operation includes selecting a button indicating "submit" displayed on the screen in accordance with the printer appl., and specifying the image file F1 in the memory 84. When the submit operation is performed, the CPU 82 of the portable terminal 70A performs each process illustrated in FIG. 3 in accordance with the printer appl.

The CPU 82 of the portable terminal 70A first supplies an access request 220 to the print intermediation server 100 via the wireless LAN I/F 78.

When obtaining the access request 220 from the portable terminal 70A, the print intermediation server 100 supplies login screen data 222 to the portable terminal 70A.

When obtaining the login screen data 222 from the print intermediation server 100 via the wireless LAN I/F 78, the CPU 82 of the portable terminal 70A causes the display unit 74 to display a login screen represented by the login screen data 222. The user inputs the account information AC1 to the portable terminal 70A by using the operation unit 72. In this case, the CPU 82 supplies a login request 224 including the account information AC1 to the print intermediation server 100 via the wireless LAN I/F 78.

When obtaining the login request 224 from the portable terminal 70A, the print intermediation server 100 performs authentication of the account information AC1 included in the login request 224. When succeeding to authenticate the account information AC1, the print intermediation server 100 creates an AT 225A, which is a token different from the AT 215A. Next, the print intermediation server 100 associates the successfully authenticated account information AC1 with the AT 225A, and stores them. As a result, in the print intermediation server 100, the account information AC1, the printer ID "xxx", the virtual print condition information, the AT 215A, and the AT 225A are associated with each other. Then, the print intermediation server 100 supplies a login success notification 226 including the AT 225A to the portable terminal 70A.

When obtaining the login success notification 226 from the print intermediation server 100 via the wireless LAN I/F 78, the CPU 82 of the portable terminal 70A creates a submit request 230. The submit request 230 includes the AT 225A included in the login success notification 226, the printer ID "xxx" of the virtual printer in the memory 84, and the image file F1 specified by the user. Then, the CPU 82 supplies the submit request 230 to the print intermediation server 100 via the wireless LAN I/F 78.

When obtaining the submit request 230 from the portable terminal 70A, the print intermediation server 100 performs authentication of the AT 225A included in the submit request 230. When judging that the AT 225A is already registered (i.e., when succeeding to authenticate the AT 225A), the print intermediation server 100 creates job information J1. The job information J1 includes the image file F1 included in the submit request 230, and file information I1. The file information I1 includes a file name of the image file F1, and date and time information indicating the date and time the image file F1 was submitted to the print intermediation server 100 (i.e., the date and time of obtaining the submit request 230).

Next, the print intermediation server 100 stores the job information J1 in association with the AT 225A and the printer ID "xxx" included in the submit request 230. Consequently, in the print intermediation server 100, the account information AC1, the printer ID "xxx", the virtual print condition information, the AT 215A, the AT 225A, and the job information J1 are associated with each other. Then, the print intermediation server 100 supplies a submit success notification 236 to the portable terminal 70A.

The CPU 82 of the portable terminal 70A obtains the submit success notification 236 from the print intermediation server 100 via the wireless LAN I/F 78. By this means, the submit process for submitting one piece of job information J1 is finished.

When the user of the portable terminal 70A further desires to submit another image file F2 to the print intermediation server 100, a submit operation which includes specifying the image file F2 is performed. By this means, the CPU 82 of the portable terminal 70A can further submit job information J2 including an image file F2 and file information I2 to the print intermediation server 100 by performing a submit process similar to the above. As a result, in the print intermediation server 100, the account information AC1, the printer ID "xxx", the virtual print condition information, the AT 215A, the AT 225A, and the two pieces of job information J1 and J2 are associated with each other.

The portable terminal 70B can submit job information J3, J4 to the print intermediation server 100 by performing a submit process similar to the case of the portable terminal 70A. Consequently, in the print intermediation server 100, the account information AC2, the printer ID "yyy", the virtual print condition information, the AT 215B, an AT 225B, and the two pieces of job information J3, J4 are associated with each other.

In the present embodiment, the two pieces of job information J1, J2 are registered in association with the account information AC1 in the print intermediation server 100. However, the number of pieces of job information associated with the account information AC1 is not limited to two, but may be one, or may be three or more. Similarly, the number of pieces of job information associated with the account information AC2 is not limited to two.

(Print Process; FIG. 4)

Subsequently, a print process for each of the portable terminals 70A, 70B to cause the printer 10 to perform a print will be described with reference to FIG. 4. The fat arrows and the thin arrows in FIG. 4 indicate NFC communication and Wi-Fi communication, respectively. In the print process, the user of the portable terminal 70A needs to be present near the printer 10. As described below, this is because the portable terminal 70A and the printer 10 need to perform an NFC communication. Consequently, for example, after returning home from a visiting place, the user causes the printer 10 to perform a print by using the portable terminal 70A.

When the submit process in FIG. 3 is performed, the account information AC1, the printer ID "xxx", the virtual print condition information, the AT 215A, the AT 225A, and the two pieces of job information J1, J2 are associated with each other in the print intermediation server 100. In this regard, since the AT 225A is a temporary token used only during the submit process, the AT 225A is not associated in FIG. 4.

When desiring to cause the printer 10 to perform a print, the user of the portable terminal 70A activates the printer appl., and performs a print operation. The print operation includes selecting a button indicating "print" displayed on the screen in accordance with the printer appl. When the print operation is performed, the CPU 82 of the portable terminal 70A performs each process illustrated in FIG. 4 in accordance with the printer appl.

The CPU 82 of the portable terminal 70A first obtains the AT 215A and the printer ID "xxx" (i.e., each piece of information stored in the memory 84 in the registration process in FIG. 2) from the memory 84. Then, the CPU 82 creates encrypted data 270A by encrypting the AT 215A and the printer ID "xxx" by using an encryption key registered in advance in the printer appl. An encryption method is not limited in particular, and is, for example, AES (abbreviation of Advanced Encryption Standard), DES (abbreviation of Data Encryption Standard) or the like.

Next, the CPU 82 of the portable terminal 70A causes the display unit 74 to display a message prompting the portable terminal 70A to be placed close to the printer 10. Consequently, the user of the portable terminal 70A places the portable terminal 70A close to the printer 10. When a distance (referred to as "device distance" below) between the NFC DT 16 of the printer 10 and the NFC I/F 76 of the portable terminal 70A reaches a state of being a predetermined distance (e.g., 10 cm) or less from having a state larger than the predetermined distance, a communication link of the NFC scheme is established between the two NFCs I/F 16, 76. Below, the communication link established here is called a "first time NFC link".

The CPU 82 of the portable terminal 70A sends the encrypted data 270A to the printer 10 by using the first time NFC link. In this regard, the CPU 82 performs an NFC communication so that it can send the encrypted data 270A to the printer 10 without using an IP address of a sending destination, a URL of the sending destination and the like. Further, as the AT 215A and the printer ID "xxx" are encrypted, it is possible to prevent a third party from illegally obtaining the AT 215A and the printer ID "xxx".

When receiving the encrypted data 270A from the portable terminal 70A by using the first time NFC link, the CPU 32 of the printer 10 obtains the actual print condition information from the memory 34. Then, the CPU 32 sends the actual print condition information to the portable terminal 70A by using the first time NFC link.

As described above, the encrypted data 270A and the actual print condition information are communicated by using the same NFC link (i.e., the first time NFC link). In other words, both the encrypted data 270A and the actual print condition information are communicated. during a period after the device distance has reached a state equal to or less than the predetermined distance (e.g., 10 cm) from being in a state larger than the predetermined distance, and before the device distance returns to the state larger than the predetermined distance.

When sending of the actual print condition information to the portable terminal 70A has ended, the CPU 32 of the printer 10 controls the display unit 14 to display a message indicating that the NFC communication has ended. By this means, the user of the portable terminal 70A can learn that the NFC communication has ended, and can move the portable terminal 70A away from the printer 10. Consequently, when the device distance reaches a state larger than the predetermined distance, the first time NFC link is disconnected.

Next, the CPU 32 of the printer 10 decrypts the encrypted data 270A by using an encryption key stored in advance in the memory 34, that is, an encryption key matching the encryption key used by the portable terminal 70A. By this means, the CPU 32 can obtain the AT 215A and the printer ID "xxx".

By receiving the actual print condition information from the printer 10 by using the first time NFC link, the CPU 82 of the portable terminal 70A can confirm that an NFC communication with the printer 10 can be performed. If the CPU 82 does not receive the actual print condition information from the printer 10, subsequent processes (e.g., supplying a file list request 280A, displaying a file selection screen) are not performed. By this means, it is possible to prevent an event in which the file selection screen is displayed and the user performs a selection despite it not being possible to cause the printer 10 to perform a print by using the portable terminal 70A.

When receiving the actual print condition information from the printer 10, the CPU 82 of the portable terminal 70A creates a file list request 280A including the AT 215A and the printer ID "xxx". Then, the CPU 82 supplies the file list request 280A to the print intermediation server 100 via the wireless LAN I/F 78 (i.e., performs a Wi-Fi communication).

When obtaining the file list request 280A from the portable terminal 70A, the print intermediation server 100 performs authentication of the AT 215A and the printer ID "xxx" included in the file list request 280A. Then, when judging that the AT 215A and the printer ID "xxx" are already registered (i.e., when succeeding in authentication), the print intermediation server 100 supplies a file list 282A to the portable terminal 70A including the file information I1, I2 associated with those pieces of information.

When obtaining the file list 282A from the print intermediation server 100 via the wireless LAN I/F 78, the CPU 82 of the portable terminal 70A controls the display unit 74 to display the file selection screen by using the file information I1, I2 included in the file list 282A. The file selection screen includes each file name and each date and time information included in the file information I1, I2. Consequently, the user can learn the file name and date and time information of each of the image files F1, F2 by looking at the file selection screen. Then, by using the operation unit 72, the user selects one or more pieces of file information corresponding to one or more image files from among each of the image files F1, F2. Below, the description will continue using as an example a case where the one piece of file information I1 corresponding to the one image file F1 has been selected by the user.

When the file information I1 is selected by the user, the CPU 82 of the portable terminal 70A controls the display unit 74 to display a print setting selection screen by using the actual print condition information received from the printer 10. The print setting selection screen is a screen for causing the user to select a print setting from the actual print condition indicated by the actual print condition information. As described above, the actual print condition information includes "A4" and "B5" as the sheet size information, and "monochrome print" as the number of colors information. Consequently, the print setting selection screen has a manner which enables a selection of "A4" or "B5" as the sheet size. The user selects the print setting by selecting the sheet size (e.g., "A4") by using the operation unit 72 while looking at the print setting selection screen. The number of colors (i.e., "monochrome print") has no option, and therefore is automatically implemented in the print setting.

When the print setting is selected by the user, the CPU 82 of the portable terminal 70A controls the display unit 74 to display a message prompting the portable terminal 70A to be placed close to the printer 10. Consequently, the user places the portable terminal 70A close to the printer 10. By this means, the device distance changes from a state of being larger than the predetermined distance to a state of being the predetermined distance or less. Consequently, a communication link of the NFC scheme between the two NFCs I/F 16, 76 is re-established. Below, the communication link established here is called a "second time NFC link".

The CPU 82 of the portable terminal 70A sends a print instruction 285A to the printer 10 by using the second time NFC link. The print instruction 285A includes the file information I1 selected by the user, and print setting information PS1 indicating the print setting selected by the user (referred to as "selected print setting" below).

When receiving the print instruction 285A from the portable terminal 70A by using the second time NFC link, the CPU 32 of the printer 10 controls the display unit 14 to display a message indicating that the NFC communication has ended. By this means, the user of the portable terminal 70A moves the portable terminal 70A away from the printer 10, and consequently the second time NFC link is disconnected.

Next, the CPU 32 of the printer 10 creates a print data request 290A. The print data request 290A includes the AT 215A and the printer ID "xxx" decrypted from the encrypted data 270A. The print data request 290A further includes the file information I1 and the print setting information PS1 included in the print instruction 285A. The print data request 290A further includes data format information indicating data format which can be interpreted by the printer 10. In the present embodiment, the data format is "PDF (abbreviation of Portable Document Format)", but in a modified embodiment the data format may be "PWG-Raster", "XPS (abbreviation of XML Paper Specification)", etc. Next, the CPU 32 supplies the print data request 290A to the print intermediation server 100 via the wireless LAN I/F 18 by using the URL of the print intermediation server 100 stored in advance in the memory 34.

When obtaining the print data request 290A from the printer 10, the print intermediation server 100 performs authentication of the AT 215A and the printer ID "xxx" included in the print data request 290A. Then, when judging that the AT 215A and the printer ID "xxx" are already registered (i.e., when succeeding in authentication), the print intermediation server 100 judges whether the selected print setting indicated by the print setting information PS1 included in the print data request 290A complies with the virtual print condition indicated by the virtual print condition information. As described above, the actual print condition of the printer 10 is included in the virtual print condition. Further, the selected print setting is selected from among the actual print condition of the printer 10. Consequently, the selected print setting is included in the virtual print condition (i.e., complies with the virtual print condition). Therefore, the print intermediation server 100 judges that the selected print setting complies with the virtual print condition.

Moreover, if the selected print setting does not comply with the virtual print condition, the print intermediation server 100 does not supply print data to the printer 10 in accordance with the print data request 290A.

When judging that the selected print setting complies with the virtual print condition, the print intermediation server 100 performs a conversion process on the image file F1 identified by the file information I1 included in the print data request 290A. Specifically, the print intermediation server 100 converts the image file F1 in accordance with the print setting information PS1 included in the print data request 290A and in accordance with the data format information "PDF" included in the print data request 290A, to create print data D1. For example, when the print setting information PS1 indicates that sheet size is "A4" and number of colors is "monochrome print", the print intermediation server 100 creates the print data D1 having the PDF format for performing a print of a monochrome image on A4 print sheets. Next, the print intermediation server 100 supplies the print data D1 to the printer 10.

The CPU 32 of the printer 10 obtains the print data D1 from the print intermediation server 100 via the wireless LAN I/F 18. In this case, the CPU 32 supplies the obtained print data D1 to the print performing unit 20. Consequently, the print performing unit 20 prints an image represented by the print data D1 onto the print sheet. By this means, the user of the portable terminal 70A can obtain the printed print sheet.

Moreover, in the above example, the one piece of file information I1 corresponding to the one image file F1 was selected by the user of the portable terminal 70A in the file selection screen. Instead, when L (L being two or more) pieces of file information (e.g., I1, I2) corresponding to L image files (e.g., F1, F2) are selected by the user, each device 10, 70A, 100 performs as follows.

The CPU 82 of the portable terminal 70A sequentially displays, on the display unit 74, L pieces of print setting selection screens corresponding to the L pieces of file information. Subsequently, the CPU 82 sequentially sends L pieces of print instructions to the printer 10 by using the second time NFC link. One piece of print instruction includes one piece of file information, and the print setting information indicating the print setting selected in the print setting selection screen corresponding to the one piece of file information.

When sequentially receiving the L pieces of print instructions from the portable terminal 70A by using the second time NFC link, the CPU 32 of the printer 10 sequentially supplies L pieces of print data requests corresponding to the L pieces of print instructions to the print intermediation server 100. One piece of print data request includes the file information and the print setting information included in the corresponding print instruction, in addition to the AT 215A, the printer ID "xxx", and the data format information "PDF". Consequently, the CPU 32 sequentially obtains, from the print intermediation server 100, L pieces of print data sequentially created in response to the L pieces of print data requests.

Then, the CPU 32 sequentially controls the print performing unit 20 to perform a print in accordance with the L pieces of print data.

Further, the portable terminal 70B can cause the printer 10 to perform a print by performing a similar operation to the portable terminal 70A. That is, the portable terminal 70B encrypts the AT 215B and the printer ID "yyy" so as to create encrypted data 270B. Then, the portable terminal 70B performs an NFC communication so as to send the encrypted data 270B to the printer 10.

When receiving the encrypted data 270B from the portable terminal 70B by performing the NFC communication, the printer 10 performs the NFC communication so as to send the actual print condition information to the portable terminal 70B. The actual print condition information sent from the printer 10 to the portable terminal 70B is the same as the actual print condition information sent from the printer 10 to the portable terminal 70A. Next, the printer 10 decrypts the encrypted data 270B so as to obtain the AT 215B and the printer ID "yyy".

When receiving the actual print condition information from the printer 10 by using the NFC communication, the portable terminal 70B performs a Wi-Fi communication so as to supply a file list request 280I3 including the AT 215B and the printer ID "yyy" to the print intermediation server 100. Then, the portable terminal 70B performs the Wi-Fi communication so as to obtain a file list 282B from the print intermediation server 100. The file list 282B includes each piece of file information (not illustrated) included in each piece of job information J3, J4.

Next, the portable terminal 70B displays a file selection screen by using each piece of file information included in the file list 282B. By this means, the user can select one or more pieces of file information. Below, the description will continue using as an example a case where specific file information (e.g., file information included in the job information J3) is selected by the user. When the specific file information is selected, the portable terminal 70B displays a print setting selection screen.

Subsequently, the portable terminal 70B sends a print instruction 285B to the printer 10 by performing an NFC communication. The print instruction 285B includes the specific file information selected by the user, and the print setting information indicating a print setting selected by the user.

When receiving the print instruction 285B from the portable terminal 70B by performing the NFC communication, the printer 10 supplies a print data request 290B to the print intermediation server 100 by performing a Wi-Fi communication. The print data request 290B includes the AT 215B, the printer ID "yyy", the specific file information included in the print instruction 285B, the print setting information included in the print instruction 285B, and the data format information "PDF". By this means, in the print intermediation server 100, print data D2 is created from the image file (e.g., the image file included in the job information J3) identified by the specific file information. Then, the printer 10 performs the Wi-Fi communication so as to obtain the print data D2 from the print intermediation server 100, and performs a print.

Figure 5:
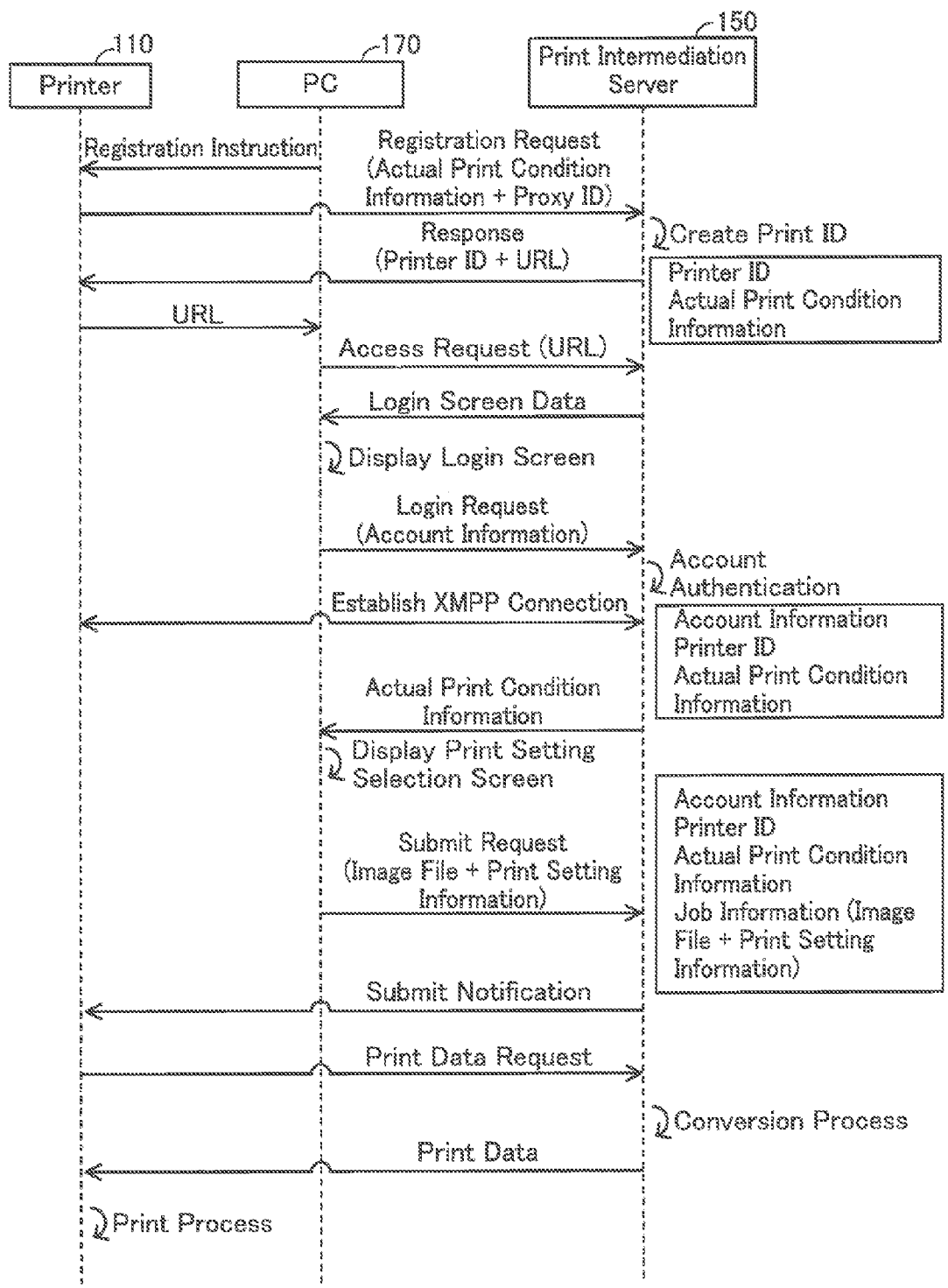
FIG. 5 illustrates a sequence diagram of a comparison embodiment.

(Comparison Embodiment; FIG. 5)

A process according to a comparison embodiment will be described with reference to FIG. 5 before an effect according to the present embodiment will be described. A system according to the comparison embodiment includes a printer 110, a PC 170 and a print intermediation server 150. The print intermediation server 150 is a GCP server provided by Google (registered trademark). The printer 110 and the PC 170 can perform a Wi-Fi communication, but cannot perform an NFC communication. Hence, all communications illustrated in FIG. 5 are Wi-Fi communications.

A user of the PC 170 first operates the PC 170 to access a web server function of the printer 110. By this means, the PC 170 accesses the web server function of the printer 110, and sends a registration instruction to the printer 110.

When receiving the registration instruction from the PC 170, the printer 110 supplies to the print intermediation server 150 a registration request including actual print condition information indicating an actual print condition of the printer 110 and a proxy ID of the printer 110. That is, in the comparison embodiment, the registration request including the actual print condition information indicating the actual print condition of the actual printer (e.g. the printer 110), not the virtual print condition information indicating the virtual print condition of a virtual printer, is supplied to the print intermediation server 150.

When obtaining the registration request from the printer 110, the print intermediation server 150 creates printer ID for identifying the printer 110 by using the proxy ID of the printer 110 included in the registration request. Next, the print intermediation server 150 associates the printer ID with the actual print condition information included in the registration request, and stores them. Then, the print intermediation server 150 supplies a response including the printer ID and a login URL to the printer 110.

When receiving the response from the intermediation server 150, the printer 110 sends the login URL included in the response to the PC 170. Further, the printer 110 stores the printer ID included in the response, and performs polling with respect to the print intermediation server 150 although not illustrated. The polling is performed to establish an XMPP (abbreviation of eXtensible Messaging and Presence Protocol) connection between the printer 110 and the print intermediation server 150 when the print intermediation server 150 successfully authenticates account information.

When receiving the login URL from the printer 110, the PC 170 sends an access request to the print intermediation server 150 with the login URL as the supply destination. Consequently, the PC 170 obtains login screen data from the print intermediation server 150 and displays a login screen. Then, the user inputs the account information to the PC 170. In this case, the PC 170 supplies a login request including the account information to the print intermediation server 150.

When obtaining the login request from the PC 170, the print intermediation server 150 performs authentication of the account information and stores the account information when succeeding to authenticate the account information. By this means, the account information, the printer ID, and the actual print condition information are associated with each other in the print intermediation server 150.

When succeeding to authenticate the account information, the print intermediation server 150 further establishes the XMPP connection between the print intermediation server 150 and the printer 110 in response to the polling from the printer 110. By this means, so-called always-on connection is established between the print intermediation server 150 and the printer 110, so that it is possible to supply a submit notification described below from the print intermediation server 150 located on a WAN side to the printer 110 located on a LAN side.

Next, when an operation to submit an image file is performed, the PC 170 obtains the actual print condition information stored in the print intermediation server 150 from the print intermediation server 150. Then, the PC 170 displays the print setting selection screen by using the actual print condition information. When a print setting is selected by the user, the PC 170 supplies a submit request including the image file and print setting information indicating the print setting to the print intermediation server 150.

When obtaining the submit request from the PC 170, the print intermediation server 150 creates job information including the image file and the print setting information, and stores the job information. By this means, in the print intermediation server 150, the account information, the printer ID, the actual print condition information, and the job information are associated with each other. Thus, in the print intermediation server 150 (i.e., GCP server), the print setting information must also be submitted when the image file is submitted.

Immediately after the image file and the print setting information are submitted, the print intermediation server 150 supplies a submit notification including a print instruction to the printer 110 by using the XMPP connection.

When obtaining the submit notification from the print intermediation server 150, the printer 110 supplies a print data request to the print intermediation server 150.

When obtaining the print data request from the printer 110, the print intermediation server 150 performs the conversion process on the image file in accordance with the print setting information, in order to create print data. Then, the print intermediation server 150 supplies the print data to the printer 110.

When obtaining the print data from the print intermediation server 150, the printer 110 performs a print of an image represented by the print data.

(Effect of First Embodiment)

As described above, in the comparison embodiment in FIG. 5, when the submission of the image file and the print setting information to the print intermediation server 150 is performed, the printer 110 obtains the submit notification from the print intermediation server 150, then obtains the print data from the print intermediation server 150, and performs a print. Consequently, the print is performed by the printer 110 immediately after the submission to the print intermediation server 150 is performed. Therefore, a print is usually performed after the submission to the print intermediation server 150 even when the user does not desire to perform a print.

In the present embodiment, as illustrated in FIG. 4, the portable terminal 70A sends the AT 215A and the printer ID "xxx" to the printer 10 by performing the NFC communication so as to send the encrypted data 270A to the printer 10. Further, the portable terminal 70A obtains the file list 282A including the file information I1, I2 from the print intermediation server 100 by using the AT 215A and the printer ID "xxx", and controls the display unit 74 to display the file selection screen. Therefore, the user can select the file information I1 from among the file information I1, I2 while looking at the file selection screen. Further, the portable terminal 70A controls the display unit 74 to display the print setting selection screen by using the actual print condition information received from the printer 10. Therefore, the user can select the print setting while looking at the print setting selection screen. Next, the portable terminal 70A performs the NFC communication so as to send the print instruction 285A including the file information I1 and the print setting information PS1 to the printer 10. Consequently, the printer 10 supplies the print data request 290A including the AT 215A, the printer ID "xxx", the file information I1, the print setting information PS1, etc. to the print intermediation server 100, and obtains the print data D1 created from the image file F1 from the print intermediation server 100.

Thus, in the present embodiment, a configuration is adopted in which the printer 10 obtains the print data D1 from the print intermediation server 100 when the print instruction 285A including the file information I1 and the print setting information PS1 is sent to the printer 10 from the portable terminal 70A. Consequently, after the job information J1, J2 has been registered in the print intermediation server 100, the user can select the desired file information 11 from among the file information I1, I2 in the file selection screen and further can select the desired print setting in the print setting selection screen. By this means, the user can cause the printer 10 to perform a print of the desired image in accordance with the desired print setting.

When an image file F2 which represents an image which is not desired to be printed is present in the image files F1, F2, the user need not select the file information I2 in the file selection screen. In this case, a print instruction including the file information I2 is not sent from the portable terminal 70A to the printer 10, and consequently a print of the image represented by the image file F2 is not performed by the printer 10. Thus, when not desiring to perform a print of the image represented by the image file F2 after the job information J2 including the image file F2 has been registered in the print intermediation server 100, the user can prevent that print from being performed. Therefore, user convenience is high.

Further, in the comparison embodiment in FIG. 5, when the image file is to be submitted to the print intermediation server 150, the PC 170 obtains the actual print condition information of the printer 110 from the print intermediation server 150, and displays the print setting selection screen. Therefore, in advance, the user must access the web server function of the printer 110, cause the printer 110 to perform the communication of the registration request with the print intermediation server 150, and register the actual print condition information of the printer 110 in the print intermediation server 150. Since it is difficult for a user with poor knowledge of the printer 110 to access the web server function of the printer 110, it is difficult for the user to perform the operation for registering the actual print condition information.

In the present embodiment, as illustrated in FIG. 4, the portable terminal 70A does not obtain the actual print condition information of the printer 10 from the print intermediation server 100, but from the printer 10. Consequently, the user does not need, in advance, to cause the printer 10 to perform a communication with the print intermediation server 100, and does not need to register the actual print condition information of the printer 10 in the print intermediation server 100. That is, as illustrated in FIG. 2, the user may register the virtual print condition information in the print intermediation server 100 by using the portable terminal 70A. The user can easily perform the operation for registering the virtual print condition information in accordance with the printer appl. Consequently, user convenience is high.

Further, in the comparison embodiment in FIG. 5, when desiring to submit the job information to the print intermediation server 150, the user must select the print setting. Since the operation for submission takes time, the user may be inconvenienced.

In the present embodiment, as illustrated in FIG. 3, when desiring to submit the job information J1, J2 to the print intermediation server 100, the user does not need to select the print setting. Therefore, the user can easily submit the job information J1, J2 to the print intermediation server 100. That is, the user can submit the job information J1, J2 right away, while whether or not to actually perform a print is in a pending state. Then, subsequently, the user may select the print setting when desiring to cause the printer 10 to actually perform a print. Consequently, user convenience is high.

For example, adoption of a configuration can be considered in which, in FIG. 4, the portable terminal 70A sends the file list 282A to the printer 10, and the file selection screen is displayed on the display unit 14 of the printer 10. Further, e.g., realization of a configuration can be considered in which, since the printer 10 has the actual print condition information, the print setting selection screen is displayed on the display unit 14 of the printer 10. However, in these configurations, the user must operate the operation unit 12 of the printer 10 to select the file information and the print setting while looking at the screen displayed on the display unit 14 of the printer 10. The display unit 14 of the printer 10 is usually smaller than the display unit 74 of the portable terminal 70A. Further, there is the possibility that the user is not familiar with the operation of the operation unit 12 of the printer 10.

In the present embodiment, as illustrated in FIG. 4, the portable terminal 70A causes the display unit 74 of the portable terminal 70A to display the file selection screen and the print setting selection screen. The user can easily select the file information and the print setting by using the operation unit 72 of the portable terminal 70A, which is familiar, while looking at a screen displayed on the relatively large display unit 74. Therefore, user convenience is high.

(Correspondence Relationship)

The Wi-Fi communication and the NFC communication are examples of "predetermined communication scheme" and "short distance communication scheme", respectively. The file selection screen and the print setting selection screen are examples of "first selection screen" and "second selection screen", respectively. The virtual print condition information and the actual print condition information are examples of "printer related information" and "print condition related information", respectively. The job information J1, J2 and the job information J3, J4 are examples of "M pieces of file related information" and "N pieces of file related information", respectively. The file information I1, I2 included in the job information J1, J2, and the file information included in the job information J3, J4 are examples of "M pieces of file identification information" and "N pieces of file identification information", respectively. In the present embodiment, the case was given as an example where "M" and are "2" respectively. However, "M" and "N" may be any value as long as it is an integer of "2" or more. The registration request 200 is an example of "first request". The two submit requests supplied from the portable terminal 70A to the print intermediation server 100 are an example of "M pieces of second requests".

The file information I1 and the image file F1 are examples of "first file identification information" and "first file", respectively. The file information included in the print instruction 285B and the image file identified by the file information are examples of "second file identification information" and "second file", respectively. The AT 215A and the printer ID are examples of "authentication information" (further examples of "first authentication information"). The AT 215B and the printer ID "yyy" are examples of "second authentication information".

Figure 6:
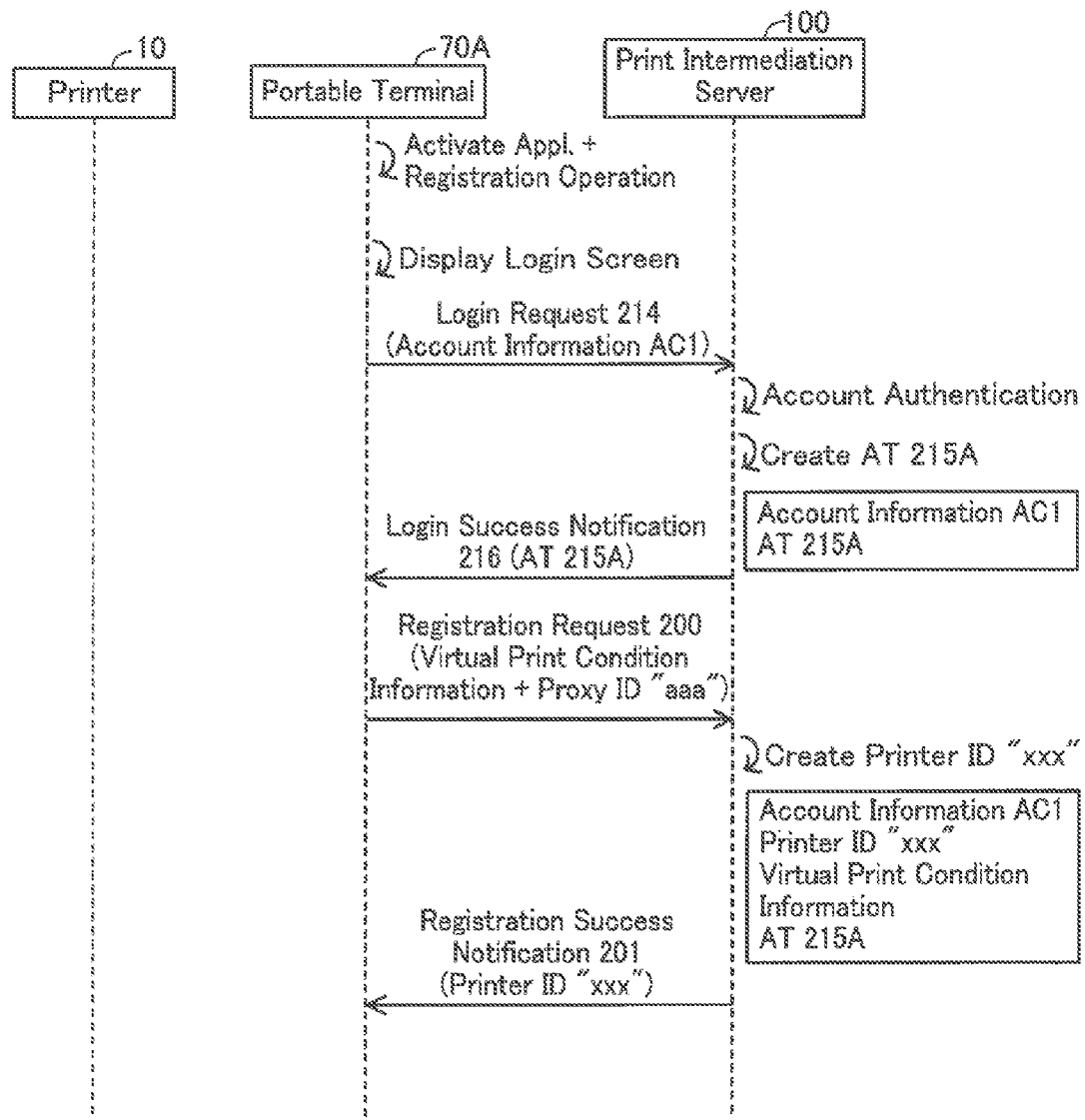
FIG. 6 illustrates a sequence diagram of a registration process according to a second embodiment.

(Second Embodiment; FIG. 6)

Although the registration process is performed by using the method of OAuth in the first embodiment (see FIG. 2), the registration process using the method of Client Login is performed in the present embodiment.

As illustrated in FIG. 6, the user of the portable terminal 70A activates the printer appl. and performs the registration operation. In this case, the CPU 82 of the portable terminal 70A controls the display unit 74 to display the login screen registered in advance in the printer appl. The user inputs the account information AC1 to the portable terminal 70A by using the operation unit 72. In this case, the CPU 82. supplies the login request 214 including the account information AC1 to the print intermediation server 100 via the wireless LAN I/F 78.

When obtaining the login request 214 from the portable terminal 70A, the print intermediation server 100 performs authentication of the account information AC1 included in the login request 214, and creates the AT 215A when succeeding to authenticate the account information AC1. Next, the print intermediation server 100 associates the successfully authenticated account information AC1 with the AT 215A, and stores them. The print intermediation server 100 supplies the login success notification 216 including the AT 215A to the portable terminal 70A.

When obtaining the login success notification 216 from the print intermediation server 100 via the wireless LAN I/F 78, the CPU 82 of the portable terminal 70A stores the AT 215A included in the login success notification 216 in the memory 84. Next, the CPU 82 supplies the registration request 200 including the virtual print condition information and the proxy ID "aaa" to the print intermediation server 100 via the wireless LAN I/F 78.

When obtaining the registration request 200 from the portable terminal 70A, the print intermediation server 100 creates the printer ID "xxx" by using the proxy ID "aaa" included in the registration request 200. Then, the print intermediation server 100 stores the printer ID "xxx" and the virtual print condition information. As a result, in the print intermediation server 100, the account information AC1, the printer ID "xxx", the virtual print condition information, and the AT 215A are associated with each other. Then, the print intermediation server 100 supplies a registration success notification 201 including the printer ID "xxx" to the portable terminal 70A.

When obtaining the registration success notification 201 from the print intermediation server 100 via the wireless LAN I/F 78, the CPU 82 of the portable terminal 70A stores in the memory 84 the printer ID "xxx" included in the registration success notification 201. By this means, the registration process is finished. The submit process and the print process are the same as those in the first embodiment (see FIG. 3, FIG. 4).

(Effect of Second Embodiment)

In the present embodiment also, the portable terminal 70A can register the virtual print condition information, the printer ID "xxx", etc. in the print intermediation server 100, and can provide the same effect as that of the first embodiment. In the present embodiment also, the AT 215A and the printer ID "xxx" are examples of "authentication information".

(Third Embodiment)

In the first embodiment, the virtual print condition information indicates all print conditions which are capable of being used actually in various models of printers sold by the vendor of the printer 10. In contrast, in the present embodiment, the virtual print condition information indicates a print condition which is capable of being used in common by the various printers sold by the vendor of the printer 10. For example, in the virtual print condition information of the present embodiment, the sheet size information indicates only "A4" and "B5", and the number of colors information indicates only "monochrome print".

In the present embodiment, the registration process and the submit process are the same as those in the first embodiment (see FIG. 2, FIG. 3) except in the point that the contents are different of the virtual print condition indicated by the virtual print condition information. In the present embodiment, the contents of the print process are different from those of the print process of the first embodiment (see FIG. 4). Below, the contents of the print process of the present embodiment will be described while a description of parts the same as the first embodiment will be omitted.

Figure 7:
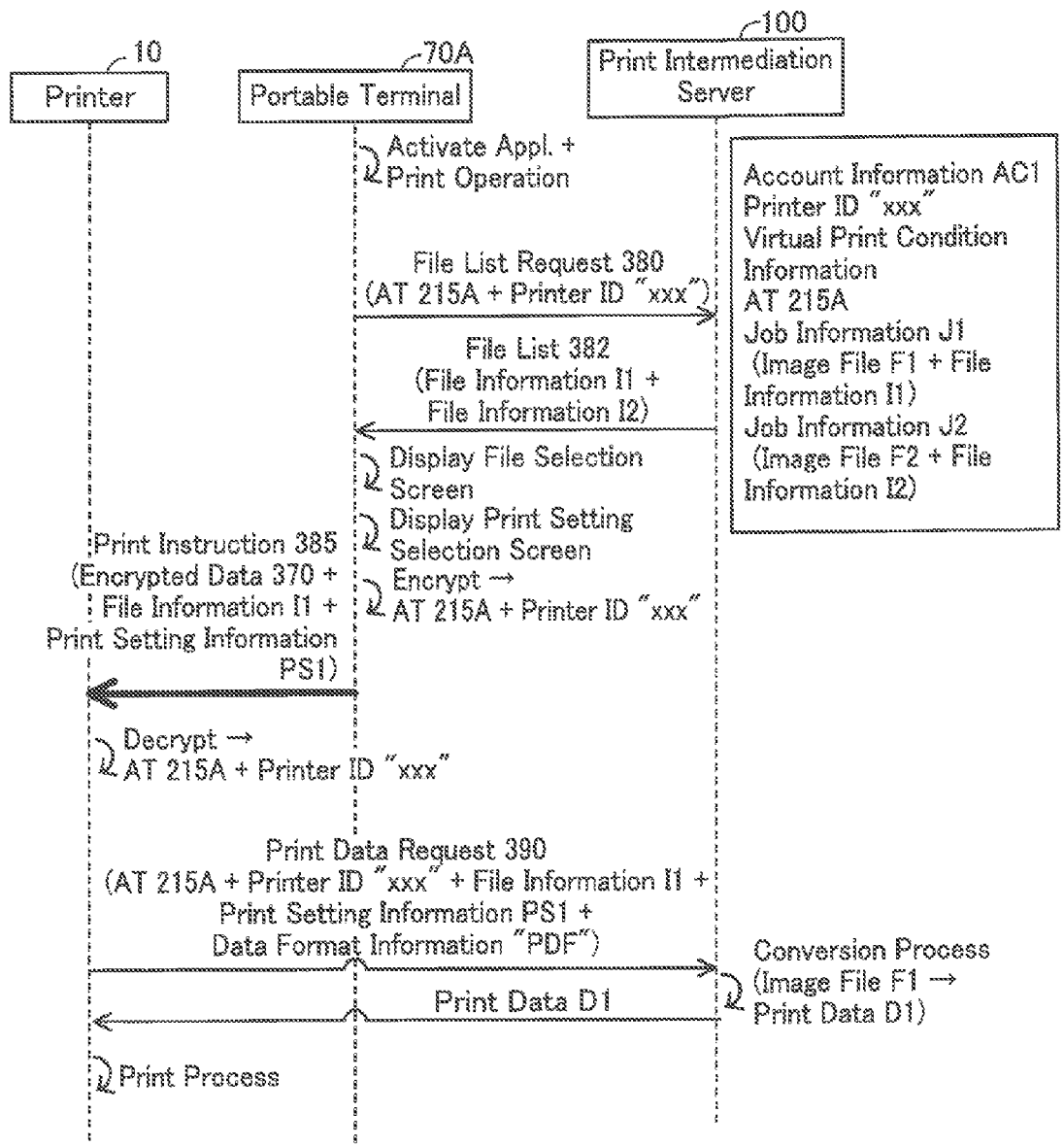
FIG. 7 illustrates a sequence diagram of a print process according to a third embodiment.

(Print Process; FIG. 7)

When the print operation is performed, the CPU 82 of the portable terminal 70A supplies a file list request 380 including the AT 215A and the printer ID "xxx" to the print intermediation server 100 via the wireless LAN I/F 78. Subsequently, the points of performing a communication of the file list 382, display of the file selection screen, and selection of the file information I1 are the same as in the first embodiment (see FIG. 4).

When the file information I1 is selected by the user, the CPU 82 of the portable terminal 70A controls the display unit 74 to display the print setting selection screen by using the virtual print condition information registered in the print appl. In the print process of the first embodiment (see FIG. 4), the print setting selection screen is displayed by using the actual print condition information. However, in the present embodiment, the print setting selection screen is displayed by using the virtual print condition information.

The virtual print condition information includes "A4" and "B5" as the sheet size information, and includes "monochrome print" as the number of colors information. Consequently, the print setting selection screen has a manner which enables a selection of "A4" or "B5" as the sheet size. The user selects the print setting by selecting sheet size. Number of colors (i.e., "monochrome print") has no option, and therefore is automatically implemented in the print setting.

When the print setting is selected by the user, the CPU 82 of the portable terminal 70A creates encrypted data 370 by encrypting the AT 215A and the printer ID "xxx". Next, the CPU 82 of the portable terminal 70A sends a print instruction 385 to the printer 10 by using a NFC link. The print instruction 385 includes the encrypted data 370, the file information I1, and the print setting information PS1.

When receiving the print instruction 385 from the portable terminal 70A by using the NFC link, the CPU 32 of the printer 10 decrypts the encrypted data 370 included in the print instruction 385, and obtains the AT 215A and the printer ID "xxx". Next, the CPU 32 supplies a print data request 390 to the print intermediation server 100 via the wireless LAN I/F 18. The print data request 390 includes the AT 215A, the printer ID "xxx", the file information I1, the print setting information PS1, and the data format information "PDF".

Subsequently, the points of the print data D1 being created by the print intermediation server 100, and the print being performed by the printer 10 are the same as the print process of the first embodiment (see FIG. 4).

(Effect of Third Embodiment)

The same effect as that of the first embodiment can be obtained in the present embodiment also. Further, in the present embodiment, the virtual print condition information indicates a print condition which is capable of being used in common by the various printers sold by the vendor of the printer 10. Consequently, the print setting selected from among the virtual print condition in the print setting selection screen complies with the actual print condition of the printer 10. Therefore, the printer 10 can properly perform a print by using the print data D1 created in accordance with the selected print setting.

Further, in the present embodiment, the encrypted data 370, the file information I1, and the print setting information PS1 are sent from the portable terminal 70A to the printer 10 by using the same NFC link (i.e., a single NFC link). That is, each piece of information 370, I1, PS1 is sent simultaneously from the portable terminal 70A to the printer 10. Use of a configuration is assumed in which a part of the information among the information 370, I1, PS1 is sent by using a first time NFC link, this NFC link is disconnected, and then the other information among the information 370, I1, PS1 is sent by using a second time NFC link. In this case, the operation of the user placing the portable terminal 70A close to the printer 10 must be performed two times. In contrast, in the present embodiment, it is sufficient to perform the operation of placing the portable terminal 70A close to the printer 10 only one time. Therefore, user convenience is high.

In the present embodiment, the print instruction 385 including the encrypted data 370 and the file information I1 is an example of "print instruction including authentication information and first file identification information". Generally speaking, sending of authentication information and sending of a print instruction may be performed at different timings, as in the first embodiment, or may be performed at the same timings, as in the present embodiment.

(Fourth Embodiment)

In each of the above embodiments, the print intermediation server 100 is a server provided by the vendor of the printer 10. However, in the present embodiment, the print intermediation server 100 is a GCP server provided by Google (registered trademark). As described in the comparison embodiment of the first embodiment (see FIG. 5), in the GCP server, the print setting information must also be submitted when the submission of the image file is performed.

Further, in the present embodiment, as in the third embodiment, the virtual print condition information indicates a print condition which is capable of being used in common by the various printers sold by the vendor of the printer 10. In the present embodiment, contents of the submit process and the print process are different from the processes of the first embodiment (see FIG. 3, FIG. 4). Below, the contents of the submit process and the print process of the present embodiment will be described, and a description of parts the same as the first embodiment will be omitted.

(Submit Process; FIG. 8)

The point of communication between the portable terminal 70A and the print intermediation server 100 of an access request 420, login screen data 422, a login request 424, and a login success notification 426 is the same as in the first embodiment (see FIG. 3).

When obtaining the login success notification 426 from the print intermediation server 100 via the wireless LAN I/F 78, the CPU 82 of the portable terminal 70A controls the display unit 74 to display the print setting selection screen by using the virtual print condition information registered in the print appl. In the first embodiment, the print setting selection screen is displayed in the print process (see FIG. 4). However, in the present embodiment, the print setting selection screen is displayed in the submit process. The user selects the print setting from among the virtual print condition while looking at the print setting screen.

When the print setting is selected by the user, the CPU 82 of the portable terminal 70A creates a submit request 430. The submit request 430 includes the AT 225A, the printer ID "xxx", the image file F1, and the print setting information PS1. The point of the print setting information PS1 being included in the submit request 430 is different from the submit request 230 of the first embodiment (see FIG. 3). The CPU 82 supplies the submit request 430 to the print intermediation server 100 via the wireless LAN I/F 78.

The print intermediation server 100 obtains the submit request 430 from the portable terminal 70A and, when succeeding to authenticate the AT 225A included in the submit, request 430, creates the job information J1, and stores it. The job information J1 includes the image file F1, the file information I1, and the print setting information PS1. The point of the job information J1 including the print setting information PS1 is different from the job information J1 of the first embodiment (see FIG. 3).

Subsequently, the point of communicating a submit success notification 436 between the portable terminal 70A and the print intermediation server 100, and the point of performing a similar submit process and storing the job information J2 in the print intermediation server 100 are the same as those in the first embodiment (see FIG. 3). However, the point of the job information J2 including print setting information PS2 is different from the job information J2 of the first embodiment (see FIG. 3).

(Print Process; FIG. 9)

When the print operation is performed, the CPU 82 of the portable terminal 70A supplies a file list request 480 including the AT 215A and the printer ID "xxx" to the print intermediation server 100 via the wireless LAN I/F 78. Subsequently, the points of performing a communication of a file list 482, display of the file selection screen, and selection of the file information I1 are the same as in the first embodiment (see FIG. 4).

In the present embodiment, in the submit process, the print setting information PS1, PS2 are already registered in the print intermediation server 100 together with the image files F1, F2 (see FIG. 8). Consequently, the CPU 82 of the portable terminal 70A does not display the print setting selection screen after the selection of the file information I1 in the file selection screen.

When the file information I1 is selected in the file selection screen, the CPU 82 of the portable terminal 70A creates encrypted data 470 by encrypting the AT 215A and the printer ID "xxx". Next, the CPU 82 sends a print instruction 485 to the printer 10 by using a NFC link. The print instruction 485 includes the encrypted data 470 and the file information I1.

When receiving the print instruction 485 from the portable terminal 70A by using the NFC link, the CPU 32 of the printer 10 decrypts the encrypted data 470 included in the print instruction 485, and obtains the AT 215A and the printer ID "xxx". Next, the CPU 32 supplies a print data request 490 to the print intermediation server 100 via the wireless LAN I/F 18. The print data request 490 includes the AT 215A, the printer ID "xxx", the file information I1, and the data format information "PDF". The point of the print data request 490 not including print setting information is different from the print data request 290A of the first embodiment (see FIG. 4).

In the print intermediation server 100, subsequent processes are the same as those in the first embodiment (see FIG. 4), excepting the point of performing a conversion process on the image file F1 by using the print setting information PS1 included in the job information J1.

(Effect of Fourth Embodiment)

The same effect as that of the first embodiment can be obtained in the present embodiment also. Further, in the present embodiment also, as in the third embodiment, the print setting selected from among the virtual print condition complies with the actual print condition of the printer 10. Therefore, the printer 10 can properly perform a print by using the print data D1 created in accordance with the selected print setting.

Further, in the present embodiment, the encrypted data 470 and the file information I1 are sent simultaneously from the portable terminal 70A to the printer 10 by using the same NFC link (i.e., a single NFC link). In the present embodiment, it is sufficient to perform the operation of placing the portable terminal 70A close to the printer 10 only one time. Therefore, user convenience is high. Moreover, in the present embodiment, the print instruction 485 including the encrypted data 470 and the file information I1 is an example of "print instruction including authentication information and first file identification information".

(Modified Embodiment 1)

In each of the above embodiments, the portable terminal 70A displays the print setting selection screen (see FIG. 4, FIG. 7, FIG. 8). Instead, the configuration below may be adopted. For example, the print intermediation server 100 may create the print data by performing a conversion process of the image file in accordance with a predetermined default print setting. In this case, the portable terminal 70A need not display the print setting selection screen. That is, "controlling the display unit to display a second selection screen" may be omitted.

(Modified Embodiment 2)

In the print process in FIG. 4, the portable terminal 70A sends the encrypted data 270A to the printer 10 by using the first time NFC link, and receives the actual print condition information from the printer 10 by using the first time NFC link. Instead, without sending the encrypted data 270A to the printer 10, the portable terminal 70A may send an actual print condition information request to the printer 10 by using the first time NFC link, and receive the actual print condition information from the printer 10 by using the first time NFC link. In this case, the portable terminal 70A may send the print instruction 285A including the file information I1, the print setting information PS1, and the encrypted data 270A to the printer 10 by using the second time NFC link. In this modified embodiment also, authentication information can be properly sent to the printer.

(Modified Embodiment 3)

The vendor of the printer 10 may install an information providing server on the Internet. For each of a plurality of types of printer sold by the vendor, the information providing server associates a model name of the printer with actual print condition information of the printer, and stores them. In the print process in FIG. 4, the portable terminal 70A receives the actual print condition information from the printer 10, but may instead receive a model name of the printer 10 from the printer 10. In this case, the portable terminal 70A supplies the model name of the printer 10 to the information providing server, obtains the actual print condition information of the printer 10 from the information providing server, and displays the print setting selection screen by using the actual print condition information. In this modified embodiment, the model name of the printer 10 is an example of "print condition related information".

(Modified Embodiment 4)

The application for printer may include, for each of the plurality of types of printer, information in which a model name of the printer and actual print condition information of the printer are associated with each other. Then, as in the modified embodiment 3 described above, the portable terminal 70A may receive the model name of the printer 10 from the printer 10. In this case, the portable terminal 70A obtains the actual print condition information of the printer 10 associated with the model name of the printer 10 from the application for printer, and displays the print setting selection screen by using the actual print condition information. In this modified embodiment, the model name of the printer 10 is an example of "print condition related information".

(Modified Embodiment 5)

In each of the above embodiments, e.g., in the print process in FIG. 4, the user uses the portable terminal 70A to cause the printer 10 to perform a print of the image represented by the image file F1 submitted by the portable terminal 70A. Instead, e.g., in the submit process in FIG. 3, the user may submit the image file F1 to the print intermediation server 100 from a specific device (e.g., PC, the portable terminal 70B, etc.) different from the portable terminal 70A by using the user's own account information. Then, in the print process in FIG. 4, the user may use the portable terminal 70A to cause the printer 10 to perform a print of the image represented by the image file F1 submitted by the specific device. Generally speaking, file related information registered in a print intermediation server may be registered by a terminal device, or may be registered by a device different from the terminal device.

(Modified Embodiment 6)

In each of the above embodiments, in the registration process in FIG. 2, the portable terminal 70A sends the registration request 200 including the virtual print condition information to the print intermediation server 100. instead, when e.g., the virtual print condition information is stored on a data server on the Internet (e.g., a server provided by the vendor of the printer 10), the portable terminal 70A may send a registration request including a URL of the virtual print condition information to the print intermediation server 100. In this case, the print intermediation server 100 may obtain the virtual print condition information from the data server by using the URL of the virtual print condition information, and store the virtual print condition information. In this modified embodiment, the registration request which includes the URL of the virtual print condition information is an example of "first request". Further, in another modified embodiment, when the print intermediation server 100 is a server provided by the vendor of the printer 10, the print intermediation server 100 may have virtual print condition information in advance. In this case, the portable terminal 70A may send to the print intermediation server 100 a registration request not including the virtual print condition information nor the URL of the virtual print condition information. in this modified embodiment, this registration request is an example of "first request".

(Modified Embodiment 7)

In each of the above embodiments, the AT 215A created in the registration process in FIG. 2 is registered in the print intermediation server 100 in a situation that the print process in FIG. 4 is performed. In this regard, when the print process in FIG. 4 is performed, an expiration period of the AT 215A may end. Hence, in the registration process in FIG. 2, the print intermediation server 100 may create not only the AT 215A but also a so-called refresh token, and associate the refresh token with the account information AC1 and the like and store the refresh token. In this case, the print intermediation server 100 can create a new token by using the refresh token when the expiration period of the AT 215A ends, and store the new token instead of the AT 215A. Then, the portable terminal 70 receives the login success notification 216 including not only the AT 215A but also the refresh token from the print intermediation server 100. Then, in the print process in FIG. 4, the portable terminal 70A sends the encrypted data 270A including not only the AT 215A but also the refresh token to the printer 10. In this case, the printer 10 can create a new token by using the refresh token, and can obtain the print data D1 from the print intermediation server 100 by using the new token when the expiration period of the AT 215A ends. In this modified embodiment, the refresh token is an example of "authentication information".

(Modified Embodiment 8)

In each of the above embodiments, e.g., in the submit process in FIG. 3, the portable terminal 70A sends the submit request 230 including the image file F1 to the print intermediation server 100. Instead, when e.g., the image file F1 is stored on a data server on the Internet, the portable terminal 70A may send the submit request 230 including a URL of the image file F1 to the print intermediation server 100. In this case, the print intermediation server 100 stores the job information J1 including the URL of the image file F1 and the file information I1. Then, when receiving the print data request 290A from the printer 10 in the print process in FIG. 4, the print intermediation server 100 may obtain the image file F1 from the data server by using the URL of the image file F1, convert the image file F1, and create the print data D1. In this modified embodiment, the URL of the image file F1 is an example of "file related information".

(Modified Embodiment 9)

In each of the above embodiments, "authentication information" includes printer ID and a token (i.e., the AT 215A). However, if the configuration of the print intermediation server 100 allows authentication to be performed by using only a printer ID without using a token, "authentication information" may include only the printer ID and not include a token. Further, if the configuration of the print intermediation server 100 allows authentication to be performed by using only a token without using a printer ID, "authentication information" may include only the token and not include a printer ID. Generally speaking, "authentication information" may be any information used to perform authentication in the print intermediation server.

(Modified Embodiment 10)

"Printer related information" is not limited to the virtual print condition information, but may include information indicating a virtual printer name of the virtual printer, information indicating a virtual default setting of the virtual printer, information indicating a virtual status of the virtual printer, etc.

(Modified Embodiment 11)

In each of the above embodiments, the virtual print condition information is registered in advance in the printer appl. That is, the memory 84 of the portable terminal 70A stores the virtual print condition information when the printer appl. is installed to the portable terminal 70A. Instead, a configuration may be adopted in which, e.g., the user inputs the virtual print condition information to the portable terminal 70A. In this case, the memory 84 may store the virtual print condition information input by the user.

(Modified Embodiment 12)

In each of the above embodiments, in the print process in FIG. 4, the portable terminal 70A sends the encrypted data 270A created by encrypting the printer ID "xxx" and the AT 215A to the printer 10. Instead, the portable terminal 70A may send the printer ID "xxx" and the AT 215A to the printer 10 without performing encryption. Generally speaking, it is enough to send authentication information to a printer.

(Modified Embodiment 13)

The printer 10 and the portable terminal 70A may perform a communication of the encrypted data 270A, the actual print condition information, and the print instruction 285A by performing, instead of performing a wireless communication in accordance with the NFC scheme, a short distance wireless communication of another communication scheme (e.g. a wireless communication in accordance with a transfer jet scheme, an infrared scheme or the like). In this modified embodiment, the another communication scheme is an example of "short distance communication scheme". Further, the printer 10 and the portable terminal 70A may perform a communication of the encrypted data 270A or the like by performing a wireless communication in accordance with the Wi-Fi scheme instead of performing a short distance wireless communication. Furthermore, the printer 10 and the portable terminal 70A may perform a communication of the encrypted data 270A or the like by performing a wired communication instead of performing a wireless communication. Generally speaking, the communication may be any communication by which the terminal device and the printer can communicate.

(Modified Embodiment 14)

The portable terminal 70A may perform a wireless communication in accordance with a cellular scheme such as 3G or 4G and perform a communication of various pieces of information (e.g. the registration request 200 in FIG. 2) with the print intermediation server 100 instead of performing a wireless communication in accordance with the Wi-Fi scheme. In this modified embodiment, the cellular scheme is an example of "predetermined communication scheme". Further, the portable terminal 70A may perform a communication with the print intermediation server 100 by performing a wired communication when the portable terminal 70A is connected to the Internet with a wired connection. Generally speaking, the communication may be any communication by which the terminal device and the print intermediation server can communicate.

(Modified Embodiment 15)

The printer 10 may perform a wired communication with the print intermediation server 100 of various pieces of information (e.g. the file list 282A in FIG. 4, etc.) when the printer 10 is connected to the Internet with a wired connection. Generally speaking, the communication may be any communication by which the printer and the print intermediation server can communicate.

(Modified Embodiment 16)

The print intermediation server 100 may not be one server and may be a plurality of servers which are configured separately. For example, the print intermediation server 100 may have a first server which performs each process in the registration process in FIG. 2, and a second server (i.e. a second server which is configured separately from the first server) which performs each process illustrated in each process in FIG. 3 and subsequent thereto.

(Modified Embodiment 17)

"Terminal device" may not be the portable terminal 70A and may be a desktop PC or another device (e.g., a television).

(Modified Embodiment 18)

In each of the above embodiments, the CPU 32 of the printer 10 and the CPU 82 of the portable terminal 70A perform a program in the memories 34 and 84 to implement each process in FIGS. 2 to 4 etc. Instead, at least one process of each process in FIGS. 2 to 4 etc. may be implemented by hardware such as a logic circuit.

What is claimed is:

1. A terminal device comprising:
    a processor; and
    a memory storing computer-readable instructions therein, the computer-readable instructions, when executed by the processor, causing the terminal device to perform:
    sending authentication information to a printer, the authentication information causing the printer to use a print intermediation server;
    obtaining, from the print intermediation server by using the authentication information, M pieces of file identification information for identifying M files, in a case where M pieces of file related information being related to the M files and the authentication information are being registered in association in the print intermediation server, M being an integer of 2 or more;

controlling a display unit of the terminal device to display a first selection screen, the first selection screen configured to receive a user selection of first file identification information from among the M pieces of file identification information; and sending, to the printer, a print instruction including the first file identification information, the authentication information and the first file identification information being used by the printer which received the print instruction, in order to obtain, from the print intermediation server, print data created from a first file identified by the first file identification information.

2. The terminal device as in claim 1, wherein the computer-readable instructions, when executed by the processor, cause the terminal device to further perform:

a specific communication with the printer, wherein the obtaining of the M pieces of file identification information is performed in a case of the specific communication being performed as a trigger.

3. The terminal device as in claim 2, wherein the specific communication includes receiving print condition related information from the printer, the print condition related information being related to an actual print condition that is capable of being used in the printer.

4. The terminal device as in claim 3, wherein the specific communication is performed in response to the sending of the authentication information to the printer.

5. The terminal device as in claim 3, wherein the computer-readable instructions, when executed by the processor, cause the terminal device to further perform:

controlling the display unit to display a second selection screen by using the print condition related information, the second selection screen configured to receive a user selection of a print setting from among the actual print condition, wherein the print instruction includes the first file identification information and print setting information indicating the print setting, and wherein the print setting information is used, together with the authentication information and the first file identification information, by the printer which received the print instruction, in order to obtain, from the print intermediation server, the print data created from the first file in accordance with the print setting.

6. The terminal device as in claim 1, wherein the sending of the authentication information to the printer is performed by sending the print instruction including the authentication information and the first file identification information to the printer.

7. The terminal device as in claim 1, wherein the computer-readable instructions, when executed by the processor, cause the terminal device to further perform:

supplying a first request to the print intermediation server, the first request causing the print intermediation server to register printer related information in the print intermediation server, the printer related information being related to a virtual printer; and obtaining, from the print intermediation server, the authentication information which is to be registered in the print intermediation server in association with the printer related information, wherein the obtaining of the M pieces of file identification information is performed by using the obtained authentication information, in a case where the printer related information, the M pieces of file related information, and the authentication information are being registered in association in the print intermediation server.

8. The terminal device as in claim 7, wherein the computer-readable instructions, when executed by the processor, cause the terminal device to further perform:

supplying M pieces of second requests to the print intermediation server, the M pieces of second requests causing the print intermediation server to register the M pieces of file related information in the print intermediation server after the printer related information is registered in the print intermediation server.

9. The terminal device as in claim 1, wherein the sending of the authentication information is performed by sending, to the printer, encrypted authentication information obtained by encrypting the authentication information.

10. The terminal device as in claim 1, wherein:

the sending of the authentication information is performed without using position information indicating a position of the printer, and the sending of the print instruction is performed without using the position information.

11. The terminal device as in claim 1, wherein:

the obtaining of the M pieces of file identification information is performed by wireless communication in accordance with a predetermined communication scheme, the sending of the authentication information is performed by wireless communication in accordance with a short distance communication scheme, the short distance communication scheme being a communication scheme for wireless communication shorter than the predetermined communication scheme, and the sending of the print instruction is performed by wireless communication in accordance with the short distance communication scheme.

12. A printer comprising:

a print performing unit;

a processor; and a memory storing computer-readable instructions therein, the computer-readable instructions, when executed by the processor, causing the printer to perform:

receiving first authentication information from a first terminal device, the first authentication information causing the printer to use a print intermediation server;

receiving, from the first terminal device, a first print instruction including first file identification information, in a case where M pieces of file related information being related to M files and the first authentication information are being registered in association in the print intermediation server, the first file identification information being selected by a user of the first terminal device from among M pieces of file identification information for identifying the M files, M being an integer of 2 or more;

obtaining, from the print intermediation server, first print data by using the first authentication information and the first file identification information, in a case where the first print instruction is received from the first terminal device, the first print data being created from a first file identified by the first file identification information; and controlling the print performing unit to perform a print by using the first print data.

13. The printer as in claim 12, wherein the computer-readable instructions, when executed by the processor, cause the printer to further perform:

receiving second authentication information from a second terminal device different from the first terminal device, the second authentication information causing the printer to use the print intermediation server;

receiving, from the second terminal device, a second print instruction including second file identification information, in a case where N pieces of file related information being related to N files and the second authentication information are being registered in association in the print intermediation server, the second file identification information being selected by a user of the second terminal device from among N pieces of file identification information for identifying the N files, N being an integer of 2 or more;

obtaining, from the print intermediation server, second print data by using the second authentication information and the second file identification information, in a case where the second print instruction is received from the second terminal device, the second print data being created from a second file identified by the second file identification information; and controlling the print performing unit to perform a print by using the second print data.

14. A non-transitory computer-readable medium storing computer-readable instructions for a terminal device, wherein the computer-readable instructions, when executed by a processor mounted on the terminal device, cause the terminal device to perform:

sending authentication information to a printer, the authentication information causing the printer to use a print intermediation server;

obtaining, from the print intermediation server by using the authentication information, M pieces of file identification information for identifying M files from the print intermediation server by using the authentication information, in a case where M pieces of file related information being related to the M files and the authentication information are being registered in association in the print intermediation server, M being an integer of 2 or more;

controlling a display unit of the terminal device to display a first selection screen, the first selection screen configured to receive a user selection of first file identification information from among the M pieces of file identification information; and sending, to the printer, a print instruction including the first file identification information, the authentication information and the first file identification information being used by the printer which received the print instruction, in order to obtain, from the print intermediation server, print data created from a first file identified by the first file identification information.

15. A non-transitory computer-readable medium storing computer-readable instructions for a terminal device, wherein:

the computer-readable instructions, when executed by a processor mounted on the terminal device, cause the terminal device to perform:

obtaining, from a print intermediation server by using authentication information, M pieces of file identification information for identifying M files, in a case where M pieces of file related information being related to the M tiles and the authentication information are being registered in association in the print intermediation server, M being an integer of 2 or more;

controlling a display unit of the terminal device to display a first selection screen, the first selection screen configured to receive a user selection of first file identification information from among the M pieces of file identification information; and sending, to a printer, the authentication information and the first file identification information, the authentication information and the first file identification information being used by the printer which received the authentication information and the first file identification information, in order to obtain, from the print intermediation server, print data created from a first file identified by the first file identification information.

16. A printer comprising:

a print performing unit;

a processor; and a memory storing computer-readable instructions therein, the computer-readable instructions, when executed by the processor, causing the printer to perform:

receiving, from a first terminal device, first authentication information and first file identification information, in a case where M pieces of file related information being related to M files and the first authentication information are being registered in association in a print intermediation server, the first file identification information being selected by a user of the first terminal device from among M pieces of file identification information for identifying the M files, M being an integer of 2 or more;

obtaining, from the print intermediation server, first print data by using the first authentication information and the first file identification information, in a case where the first authentication information and the first file identification information are received from the first terminal device, the first print data being created from a first file identified by the first file identification information; and controlling the print performing unit to perform a print by using the first print data.

* * * * *